(12) United States Patent
Joshi et al.

(10) Patent No.: US 10,834,419 B2
(45) Date of Patent: Nov. 10, 2020

(54) CONFORMANCE CONSTRAINT FOR COLLOCATED REFERENCE INDEX IN VIDEO CODING

(71) Applicant: QUALCOMM Incorporated, San Diego, CA (US)

(72) Inventors: Rajan Laxman Joshi, San Diego, CA (US); Vadim Seregin, San Diego, CA (US); Ye-Kui Wang, San Diego, CA (US); Krishnakanth Rapaka, San Diego, CA (US); Marta Karczewicz, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 399 days.

(21) Appl. No.: 15/484,879

(22) Filed: Apr. 11, 2017

(65) Prior Publication Data

US 2017/0302951 A1    Oct. 19, 2017

Related U.S. Application Data

(60) Provisional application No. 62/323,467, filed on Apr. 15, 2016, provisional application No. 62/322,160, filed on Apr. 13, 2016.

(51) Int. Cl.
*H04N 19/105* (2014.01)
*H04N 19/513* (2014.01)
(Continued)

(52) U.S. Cl.
CPC ......... *H04N 19/513* (2014.11); *H04N 19/105* (2014.11); *H04N 19/159* (2014.11);
(Continued)

(58) Field of Classification Search
CPC ...... H04N 19/513; H04N 19/52; H04N 19/70; H04N 19/159; H04N 19/105; H04N 19/46;
(Continued)

(56) References Cited

U.S. PATENT DOCUMENTS 9,313,519 B2    4/2016  Lou et al.
9,497,481 B2    11/2016 Kitahara et al.
(Continued)

FOREIGN PATENT DOCUMENTS

RU        2519526 C2     6/2014
RU        2578375 C2     3/2016
WO        2015005137 A1  1/2015

OTHER PUBLICATIONS

Response to Written Opinion dated Jul. 18, 2017, from International Application No. PCT/US2017/027244, filed Jan. 31, 2018, 3 pages.
(Continued)

*Primary Examiner* — Joseph W Becker
(74) *Attorney, Agent, or Firm* — Shumaker & Sieffert, P.A.

(57) ABSTRACT

A method of encoding video data comprising encoding a current picture of video data, generating a respective collocated reference picture index syntax element for one or more slices of the current picture, and performing a bitstream conformance check only for slices of the one or more slices that do not have an intra slice type and for which a temporal motion vector predictor is enabled, the bitstream conformance check constraining the values of the respective collocated reference picture index syntax elements such that each respective collocated reference picture index syntax element points to the same picture and does not reference the current picture itself.

23 Claims, 5 Drawing Sheets

(51) Int. Cl.
*H04N 19/52* (2014.01)
*H04N 19/159* (2014.01)
*H04N 19/46* (2014.01)
*H04N 19/70* (2014.01)
*H04N 19/172* (2014.01)
*H04N 19/174* (2014.01)
*H04N 19/184* (2014.01)

(52) U.S. Cl.
CPC ............. *H04N 19/46* (2014.11); *H04N 19/52* (2014.11); *H04N 19/70* (2014.11); *H04N 19/172* (2014.11); *H04N 19/174* (2014.11); *H04N 19/184* (2014.11)

(58) Field of Classification Search
CPC ... H04N 19/172; H04N 19/184; H04N 19/174
See application file for complete search history.

(56) References Cited

U.S. PATENT DOCUMENTS

| | | | |
|---|---|---|---|
| 2014/0362902 A1* | 12/2014 | Seregin | H04N 19/105 375/240.02 |
| 2015/0016531 A1* | 1/2015 | Hannuksela | H04N 19/70 375/240.16 |
| 2015/0264351 A1 | 9/2015 | Miyoshi | |
| 2016/0100189 A1 | 4/2016 | Pang et al. | |

OTHER PUBLICATIONS

Second Written Opinion from International Application No. PCT/US2017/027244, dated Mar. 7, 2018, 7 pages.
International Preliminary Report on Patentability from International Application No. PCT/US2017/027244, dated Jun. 4, 2018, 8 pages.
International Search Report and Written Opinion of International Application No. PCT/US2017/027244, dated Jul. 18, 2017, 16 pages.

Joshi et al., "JCT-VC AHG Report: SCC Extensions Text Editing (AHG7)", Joint Collaborative Team on Video Coding (JCT-VC) of ITU-T SG 16 WP 3 and ISO/IEC JTC 1/SC 29/WG 11, 24th Meeting: Geneva, CH, May 26-Jun. 1, 2016, JCTVC-X0007, XP030117947, 3 pp.
Joshi et al.,"HEVC Screen Content Coding Draft Text 6", Joint Collaborative Team on Video Coding (JCT-VC) of ITU-T SG 16 WP 3 AND ISO/IEC JTC 1/SC 29/WG 11, 23rd Meeting: San Diego, USA, Feb. 19-26, 2016, JCTVC-W1005-v1, ISO/IEC 23008-2:2015(E), XP030117928, 83 pp.
Seregin et al., "On Intra Block Copy Bitstream Constraints", Joint Collaborative Team on Video Coding (JCT-VC) of ITU-T SG 16 WP 3 AND ISO/IEC JTC 1/SC 29/WG 11, 21st Meeting: Warsaw, PL, Jun. 19-26, 2015, JCTVC-U0118, Jun. 10, 2015, XP030117558, 4 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
ITU-T H.263, Series H: Audiovisual and Multimedia Systems, Infrastructure of audiovisual services—Coding of moving video, Video coding for low bit rate communication, The International Telecommunication Union, Jan. 2005, 226 pp.
ITU-T H.262, Series H: Audiovisual and Multimedia Systems, Infrastructure of audiovisual services—Coding of moving video, Information technology—Generic coding of moving pictures and associated audio information: Video, The International Telecommunication Union, Feb. 2000, 220 pp.
ITU-T H.261, Line Transmission of Non-Telephone Signals, Video Codec for Audiovisual Services At p x 64 kbits, The International Telecommunication Union, Mar. 1993, 29 pp.

* cited by examiner

CONFORMANCE CONSTRAINT FOR COLLOCATED REFERENCE INDEX IN VIDEO CODING

This application claims the benefit of U.S. Provisional Application No. 62/322,160, filed Apr. 13, 2016, and U.S. Provisional Application No. 62/323,467, filed Apr. 15, 2016, the entire content of both of which is incorporated by reference herein.

TECHNICAL FIELD

This disclosure relates to video encoding and decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), ITU-T H.265, High Efficiency Video Coding (HEVC), and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized.

SUMMARY

In general, this disclosure describes techniques for utilizing an encoded bitstream conformance constraint (e.g., a modification of the HEVC bitstream conformance constraint) in a video coding process. In some examples, a bitstream conformance constraint specifies that a reference picture referred to by a syntax element (e.g., a collocated_ref_idx syntax) shall be the same for all slices of a coded picture and shall not be the current picture itself. This disclosure, describes video coding techniques and video coding scenarios in which such a constraint is applied. In other examples, this disclosure further proposes to remove any constraints that the picture referred to by collocated_ref_idx shall not be the current picture.

In other examples, this disclosure describes techniques that may improve the coding efficiency for pictures in which certain slices within the picture use only the current picture as a reference picture for predictive coding, whereas other slices within the same picture use the current picture as well as temporal pictures as reference pictures for predictive coding. In a more general case, irrespective of whether the current picture is included as a reference picture, the techniques may be applicable when certain slices within a picture use temporal motion prediction and other slices within the same picture do not use temporal motion prediction.

The techniques of this disclosure may be applicable to video codecs conforming to the high efficiency video coding (HEVC) standard (ITU-T H.265), and its extensions such as Screen Content Coding (SCC). However, the techniques of this disclosure may be used in accordance with any video coding techniques, including future video coding standards, video coding techniques supporting higher bit depths (e.g., more than 8 bits), different chroma sampling formats such as 4:4:4, 4:2:2, 4:2:0, 4:0:0, and the like.

In one example of the disclosure, a method of encoding video data comprises encoding a current picture of video data, generating a respective collocated reference picture index syntax element for one or more slices of the current picture, and performing a bitstream conformance check only for slices of the one or more slices that do not have an intra slice type and for which a temporal motion vector predictor is enabled, the bitstream conformance check constraining the values of the respective collocated reference picture index syntax elements such that each respective collocated reference picture index syntax element points to the same picture and does not reference the current picture itself.

In another example of the disclosure, an apparatus configured to encode video data comprises a memory configured to store a current picture of video data, and one or more processors configured to encode a current picture of video data, generate a respective collocated reference picture index syntax element for one or more slices of the current picture, and perform a bitstream conformance check only for slices of the one or more slices that do not have an intra slice type and for which a temporal motion vector predictor is enabled, the bitstream conformance check constrains the values of the respective collocated reference picture index syntax elements such that each respective collocated reference picture index syntax element points to the same picture and does not reference the current picture itself.

In another example, this disclosure describes a non-transitory computer-readable storage medium storing instructions that, when executed, causes one or more processors of a device configured to encode video data to encode a current picture of video data, generate a respective collocated reference picture index syntax element for one or more slices of the current picture, and perform a bitstream conformance check only for slices of the one or more slices that do not have an intra slice type and for which a temporal motion vector predictor is enabled, the bitstream conformance check constrains the values of the respective collocated reference picture index syntax elements such that each respective collocated reference picture index syntax element points to the same picture and does not reference the current picture itself.

In another example of the disclosure, an apparatus configured to decode video data comprises a memory configured to store an encoded current picture of video data, and one or more processors configured to receive the encoded current picture of video data, receive a respective collocated reference picture index syntax element for one or more slices of the encoded current picture, and perform a bitstream conformance check only for slices of the one or more slices that do not have an intra slice type and for which a temporal motion vector predictor is enabled, the bitstream conformance check determining if each respective collocated reference picture index syntax element points to the same picture and does not reference the encoded current picture itself.

The details of one or more aspects of the disclosure are set forth in the accompanying drawings and the description below. Other features, objects, and advantages of the techniques described in this disclosure will be apparent from the description, drawings, and claims.

DETAILED DESCRIPTION

Figure 1:
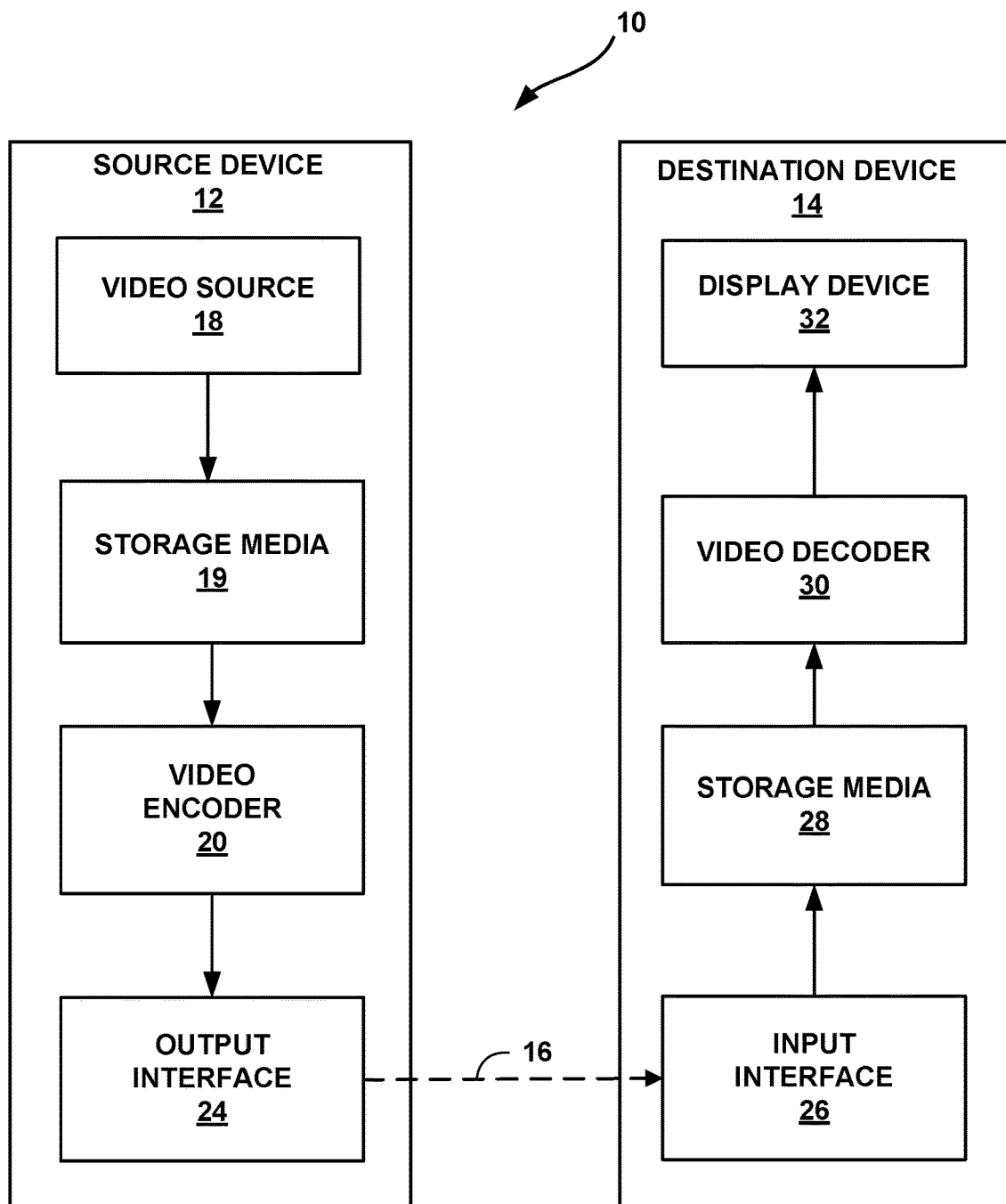
FIG. 1 is a block diagram illustrating an example video encoding and decoding system that may utilize one or more techniques described in this disclosure.

This disclosure describes techniques for utilizing an encoded bitstream conformance constraint (e.g., a modification of the HEVC bitstream conformance constraint). In some examples, a bitstream conformance constraint specifies that the reference picture referred to by a syntax element (e.g., a collocated_ref_idx syntax element) shall be the same for all slices of a coded picture and shall not be the current picture itself. This disclosure describes techniques and coding scenarios in which such a constraint is applied. In other examples, this disclosure further proposes to remove any constraints that the picture referred to by collocated_ref_idx shall not be the current picture.

In other examples, this disclosure describes methods to improve the coding efficiency for pictures in which certain slices within the picture use only the current picture as reference, whereas other slices within the same picture use the current picture as well as temporal pictures as reference. In a more general case, irrespective of whether the current picture is included as a reference picture, example techniques of this disclosure are applicable when certain slices within a picture use temporal motion prediction and other slices within the same picture don't use temporal prediction.

The techniques of this disclosure may be applicable to video codecs conforming to the high efficiency video coding (HEVC) standard (ITU-T H.265), and its extensions such as Screen Content Coding (SCC). However, the techniques of this disclosure may be used in accordance with any video coding techniques, including future video coding standards, video coding techniques supporting higher bit depths (e.g., more than 8 bits), different chroma sampling formats such as 4:4:4, 4:2:2, 4:2:0, 4:0:0, and the like.

A video sequence is generally represented as a sequence of pictures. Typically, block-based coding techniques are used to code each of the individual pictures. That is, each picture is divided into blocks, and each of the blocks is individually coded. Coding a block of video data generally involves forming predicted values for samples (e.g., pixel values, such a luma samples and/or chroma samples) in the block and coding residual values. The predicted values are formed using samples in one or more predictive blocks. The residual values represent the differences between the pixels of the original block and the predicted sample values. Specifically, the original block of video data includes an array of sample values, and the predicted block includes an array of predicted pixel values. The residual values represent sample-by-sample differences between the sample values of the original block and the predicted sample values.

Prediction techniques for a block of video data are generally categorized as intra-prediction and inter-prediction. Intra-prediction, or spatial prediction, generally involves predicting the block from pixel values of neighboring, previously coded blocks in the same picture. Inter-prediction, or temporal prediction, generally involves predicting the block from pixel values of one or more previously coded pictures. Other prediction techniques, including palette-based coding techniques, and intra Block Copy techniques, may be used for coding screen content (e.g., screen content coding (SCC)).

FIG. 1 is a block diagram illustrating an example video encoding and decoding system 10 that may utilize techniques of this disclosure. As shown in FIG. 1, system 10 includes a source device 12 that provides encoded video data to be decoded, e.g., in near real time or at a later time, by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, tablet computers, televisions, cameras, display devices, digital media players, video gaming consoles, video streaming device, or the like. In some cases, source device 12 and destination device 14 may be equipped for wireless communication. Thus, source device 12 and destination device 14 may be wireless communication devices. Source device 12 is an example video encoding device (i.e., a device for encoding video data). Destination device 14 is an example video decoding device (i.e., a device for decoding video data).

In the example of FIG. 1, source device 12 includes a video source 18, storage media 19 configured to store video data, a video encoder 20, and an output interface 24. Destination device 14 includes an input interface 26, a storage media 28 configured to store encoded video data, a video decoder 30, and display device 32. In other examples, source device 12 and destination device 14 include other components or arrangements. For example, source device 12 may receive video data from an external video source, such as an external camera. Likewise, destination device 14 may interface with an external display device, rather than including an integrated display device.

The illustrated system 10 of FIG. 1 is merely one example. Techniques for processing video data may be performed by any digital video encoding and/or decoding device. Although generally the techniques of this disclosure are performed by a video encoding device, the techniques may also be performed by a video encoder/decoder, typically referred to as a "CODEC." Source device 12 and destination device 14 are merely examples of such coding devices in which source device 12 generates coded video data for transmission to destination device 14. In some examples, source device 12 and destination device 14 may operate in a substantially symmetrical manner such that each of source device 12 and destination device 14 include video encoding and decoding components. Hence, system 10 may support one-way or two-way video transmission between source device 12 and destination device 14, e.g., for video streaming, video playback, video broadcasting, or video telephony.

Video source 18 of source device 12 may include a video capture device, such as a video camera, a video archive containing previously captured video, and/or a video feed interface to receive video data from a video content provider. As a further alternative, video source 18 may generate computer graphics-based data as the source video, or a combination of live video, archived video, and computer-generated video. Source device 12 may comprise one or more data storage media (e.g., storage media 19) configured to store the video data. The techniques described in this disclosure may be applicable to video coding in general, and may be applied to wireless and/or wired applications. In each case, the captured, pre-captured, or computer-generated video may be encoded by video encoder 20. Output interface 24 may output the encoded video information to a computer-readable medium 16.

Destination device 14 may receive the encoded video data to be decoded via computer-readable medium 16. Computer-readable medium 16 may comprise any type of medium or device capable of moving the encoded video data from source device 12 to destination device 14. In some examples, computer-readable medium 16 comprises a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14. Destination device 14 may comprise one or more data storage media configured to store encoded video data and decoded video data.

In some examples, encoded data may be output from output interface 24 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 26 of destination device 14 receives information from computer-readable medium 16. The information of computer-readable medium 16 may include syntax information defined by video encoder 20 of video encoder 20, which is also used by video decoder 30, that includes syntax elements that describe characteristics and/or processing of blocks and other coded units, e.g., groups of pictures (GOPs). Storage media 28 may store encoded video data received by input interface 26. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 each may be implemented as any of a variety of suitable encoder or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

In some examples, video encoder 20 and video decoder 30 may operate according to a video coding standard such as an existing or future standard. Example video coding standards include, but are not limited to, ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-View Video Coding (MVC) extensions. In addition, a new video coding standard, namely High Efficiency Video Coding (HEVC) or ITU-T H.265, including its range and SCC extensions, 3D video coding (3D-HEVC) and multiview extensions (MV-HEVC) and scalable extension (SHVC), has recently been developed by the Joint Collaboration Team on Video Coding (JCT-VC) of ITU-T Video Coding Experts Group (VCEG) and ISO/IEC Motion Picture Experts Group (MPEG).

In HEVC and other video coding specifications, a video sequence typically includes a series of pictures. Pictures may also be referred to as "frames." A picture may include three sample arrays, denoted $S_L$, $S_{Cb}$, and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

To generate an encoded representation of a picture, video encoder 20 may generate a set of coding tree units (CTUs). Each of the CTUs may comprise a coding tree block of luma samples, two corresponding coding tree blocks of chroma samples, and syntax structures used to code the samples of the coding tree blocks. In monochrome pictures or pictures having three separate color planes, a CTU may comprise a single coding tree block and syntax structures used to code the samples of the coding tree block. A coding tree block may be an N×N block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more coding units (CUs). A slice may include an integer number of CTUs ordered consecutively in a raster scan order.

This disclosure may use the term "video unit" or "video block" or "block" to refer to one or more sample blocks and syntax structures used to code samples of the one or more blocks of samples. Example types of video units may include CTUs, CUs, PUs, transform units (TUs), macroblocks, macroblock partitions, and so on. In some contexts, discussion of PUs may be interchanged with discussion of macroblocks or macroblock partitions. Example types of video blocks may include coding tree blocks, coding blocks, and other types of blocks of video data.

To generate a coded CTU, video encoder 20 may recursively perform quad-tree partitioning on the coding tree blocks of a CTU to divide the coding tree blocks into coding blocks, hence the name "coding tree units." A coding block is an N×N block of samples. A CU may comprise a coding block of luma samples and two corresponding coding blocks of chroma samples of a picture that has a luma sample array, a Cb sample array, and a Cr sample array, and syntax structures used to code the samples of the coding blocks. In monochrome pictures or pictures having three separate color planes, a CU may comprise a single coding block and syntax structures used to code the samples of the coding block.

Video encoder 20 may partition a coding block of a CU into one or more prediction blocks. A prediction block is a rectangular (i.e., square or non-square) block of samples on which the same prediction is applied. A prediction unit (PU) of a CU may comprise a prediction block of luma samples, two corresponding prediction blocks of chroma samples, and syntax structures used to predict the prediction blocks. In monochrome pictures or pictures having three separate color planes, a PU may comprise a single prediction block and syntax structures used to predict the prediction block. Video encoder 20 may generate predictive blocks (e.g., luma, Cb, and Cr predictive blocks) for prediction blocks (e.g., luma, Cb, and Cr prediction blocks) of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the picture that includes the PU.

After video encoder 20 generates predictive blocks (e.g., luma, Cb, and Cr predictive blocks) for one or more PUs of a CU, video encoder 20 may generate one or more residual blocks for the CU. For instance, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the Cb residual block of a CU may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may use quad-tree partitioning to decompose the residual blocks (e.g., the luma, Cb, and Cr residual blocks) of a CU into one or more transform blocks (e.g., luma, Cb, and Cr transform blocks). A transform block is a rectangular (e.g., square or non-square) block of samples on which the same transform is applied. A transform unit (TU) of a CU may comprise a transform block of luma samples, two corresponding transform blocks of chroma samples, and syntax structures used to transform the transform block samples. Thus, each TU of a CU may have a luma transform block, a Cb transform block, and a Cr transform block. The luma transform block of the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

Video encoder 20 may apply one or more transforms a transform block of a TU to generate a coefficient block for the TU. For instance, video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients.

Video encoder 20 may output a bitstream that includes encoded video data. For example, the bitstream may comprise a sequence of bits that forms a representation of coded pictures and associated data. Thus, the bitstream comprises an encoded representation of video data. The bitstream may comprise a sequence of network abstraction layer (NAL) units. A NAL unit is a syntax structure containing an indication of the type of data in the NAL unit and bytes containing that data in the form of a raw byte sequence payload (RBSP) interspersed as necessary with emulation prevention bits. Each of the NAL units may include a NAL unit header and encapsulates a RBSP. The NAL unit header may include a syntax element indicating a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Video decoder 30 may receive a bitstream generated by video encoder 20. In addition, video decoder 30 may parse the bitstream to obtain syntax elements from the bitstream. Video decoder 30 may reconstruct the pictures of the video data based at least in part on the syntax elements obtained from the bitstream. The process to reconstruct the video data may be generally reciprocal to the process performed by video encoder 20. For instance, video decoder 30 may use motion vectors of PUs to determine predictive blocks for the PUs of a current CU. In addition, video decoder 30 may inverse quantize coefficient blocks of TUs of the current CU. Video decoder 30 may perform inverse transforms on the coefficient blocks to reconstruct transform blocks of the TUs of the current CU. Video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a picture, video decoder 30 may reconstruct the picture.

In some examples, video encoder 20 may signal the motion information of a PU encoded using inter-prediction using merge mode or advanced motion vector prediction (AMVP) mode. In other words, in HEVC includes two modes for the prediction of motion parameters, one being the merge mode and the other being AMVP. Motion prediction may comprise the determination of motion information of a video unit (e.g., a PU) based on motion information of one or more other video units. The motion information of a PU may include motion vector(s) of the PU, reference index(es) of the PU, and a prediction direction.

When video encoder 20 signals the motion information of a current PU using merge mode, video encoder 20 generates a merge candidate list. In other words, video encoder 20 may perform a motion vector predictor list construction process. The merge candidate list includes a set of merge candidates that indicate the motion information of PUs that spatially or temporally neighbor the current PU. That is, in the merge mode, a candidate list of motion parameters (e.g., reference indexes, motion vectors, etc.) is constructed where a candidate can be from spatial and temporal neighboring blocks.

Furthermore, in merge mode, video encoder 20 may select a merge candidate from the merge candidate list and may use the motion information indicated by the selected merge candidate as the motion information of the current PU. Video encoder 20 may signal the position in the merge candidate list of the selected merge candidate. For instance, video encoder 20 may signal the selected motion vector parameters by transmitting an index into the candidate list. Video decoder 30 may obtain, from the bitstream, the index into the candidate list (i.e., a candidate list index). In addition, video decoder 30 may generate the same merge candidate list and may determine, based on the indication of the position of the selected merge candidate, the selected merge candidate. Video decoder 30 may then use the motion information of the selected merge candidate to generate predictive blocks for the current PU. Video decoder 30 may determine, based at least in part on the candidate list index, a selected candidate in the candidate list, wherein the selected candidate specifies the motion vector for the current PU. In this way, at the decoder side, once the index is decoded, all motion parameters of the corresponding block where the index points may be inherited by the current PU.

Skip mode may be considered a special case of merge mode. In skip mode, video encoder 20 and video decoder 30 generate and use a merge candidate list in the same way that video encoder 20 and video decoder 30 use the merge candidate list in merge mode. However, when video encoder 20 signals the motion information of a current PU using skip mode, video encoder 20 does not signal any residual data for the current PU. Accordingly, video decoder 30 may determine, without use of residual data, a predictive block for the PU based on a reference block indicated by the motion information of a selected candidate in the merge candidate list.

AMVP mode is similar to merge mode in that video encoder 20 may generate a candidate list and may select a candidate from the candidate list. However, when video encoder 20 signals the reference picture list (RefPicListX) motion information of a current PU using AMVP mode, video encoder 20 may signal a RefPicListX MVD for the current PU and a RefPicListX reference index for the current PU in addition to signaling a RefPicListX MVP flag for the current PU. The RefPicListX MVP flag for the current PU may indicate the position of a selected AMVP candidate in the AMVP candidate list. The RefPicListX MVD for the current PU may indicate a difference between a RefPicListX motion vector of the current PU and a motion vector of the selected AMVP candidate. In this way, video encoder 20 may signal the RefPicListX motion information of the current PU by signaling a RefPicListX MVP flag, a RefPicListX reference index value, and a RefPicListX MVD. In other words, the data in the bitstream representing the motion vector for the current PU may include data representing a reference index, an index to a candidate list, and an MVD.

Furthermore, when the motion information of a current PU is signaled using AMVP mode, video decoder 30 may obtain, from the bitstream, a MVD for a current PU and a MVP flag. Video decoder 30 may generate the same AMVP candidate list and may determine, based on the MVP flag, the selected AMVP candidate. Video decoder 30 may recover a motion vector of the current PU by adding the MVD to the motion vector indicated by the selected AMVP candidate. That is, video decoder 30 may determine, based on a motion vector indicated by the selected AMVP candidate and the MVD, the motion vector of the current PU. Video decoder 30 may then use the recovered motion vector or motion vectors of the current PU to generate predictive blocks for the current PU.

A candidate in a merge candidate list or an AMVP candidate list that is based on the motion information of a PU that temporally neighbors a current PU (i.e., a PU that is in a different time instance than the current PU) may be referred to as a temporal motion vector predictor (TMVP). To determine a TMVP, a video coder (e.g., video encoder 20 and/or video decoder 30) may firstly identify a reference picture that includes a PU that is co-located with the current PU. In other words, the video coder may identify a co-located picture. If the current slice of the current picture is a B slice (i.e., a slice that is allowed to include bi-directionally inter predicted PUs), video encoder 20 may signal, in a slice header, a syntax element (e.g., collocated_from_l0_flag) that indicates which reference picture list the co-located picture is from (e.g., RefPicList0 or RefPicList1). After video decoder 30 identifies the reference picture list that includes the co-located picture, video decoder 30 may use another syntax element (e.g., collocated_ref_idx), which may be signaled in a slice header, to identify the co-located reference picture in the identified reference picture list.

A video coder may identify a co-located PU by checking a reference picture identified by a reference picture index (e.g., as indicated by a collocated_ref_idx syntax element). The TMVP may indicate either the motion information of a right-bottom PU of the CU containing the co-located PU, or the motion information of the right-bottom PU within the center PUs of the CU containing this PU. The right-bottom PU of the CU containing the co-located PU may be a PU that covers a location immediately below and right of a bottom-right sample of a prediction block of the PU. In other words, the TMVP may indicate the motion information of a PU that is in the reference picture and that covers a location that is co-located with a bottom right corner of the current PU, or the TMVP may indicate the motion information of a PU that is in the reference picture and that covers a location that is co-located with a center of the current PU.

When motion vectors identified by the above process are used to generate a motion candidate for merge mode or AMVP mode, the motion vectors may be scaled based on the temporal location (reflected by picture order count (POC) value). For instance, a video coder may increase the magnitude of a motion vector by greater amounts when a difference between the POC values of a current picture and a reference picture is greater than when a difference between the POC values of the current picture and the reference picture is less. In HEVC, a sequence parameter set (SPS) includes an sps_enable_temporal_mvp_flag syntax element. The sps_enable_temporal_mvp_flag syntax element specifies whether temporal motion vector predictors can be used or not.

Many applications, such as remote desktop, remote gaming, wireless displays, automotive infotainment, cloud computing, or the like, are becoming routine in daily personal lives. Video content in these applications are typically combinations of natural content, text, artificial graphics, and the like. In text and artificial graphics, one or more regions of the content may include repeated patterns (such as characters, icons, and symbols to provide a few examples) often exist. Intra block copying (BC) is a technique that enables removal of this kind of redundancy, thereby potentially improving the intra-picture coding efficiency. An Intra BC process was adopted in the HEVC Range Extension standard (which has since been moved to the Screen Contents Coding (SCC) extension of HEVC).

To predict a current block of video data using Intra BC techniques, a video coder may determine a block vector that identifies a predictive block of video data (i.e., a block of previously coded video data) that is within the same picture as the current block of video data. As one example, a video encoder may select the predictive block as a block of previously coded video data that is found to closely match the current block of video data, and generate a block vector that indicates a position of the predictive block relative to the current block. As another example, a video decoder may receive an indication of a block vector that indicates a position of a predictive block relative to a current block.

For a current coding unit (CU) coded using Intra BC, video encoder 20 may obtain a prediction signal (which may also be referred to as a "prediction block") from a search region in the same picture. In some instances, video encoder 20 may encode a vector, e.g., a block vector 106, which indicates the position of the prediction block displaced from the current CU. In some examples, the block vector may indicate the position of the top-left corner of the prediction block relative to the position of the top-left corner of the current CU. The block vector, in some instances, also may be referred to as an offset vector, displacement vector, or motion vector. Video encoder 20 also may encode residual data indicating differences between the pixel values of the current video block and the predictive samples in the predictive block.

In general, the intra BC coding mode may be thought of as a special form of inter prediction. Different from inter prediction, rather than obtaining predictive blocks from other pictures, intra BC coding techniques obtains predictive blocks from the same picture. However, unlike inter prediction, intra BC does not use a temporal motion vector predictor. This is because, in intra BC, the reference picture is the current picture.

In a previous version of the HEVC SCC specification, R. Joshi, et al., "High Efficiency Video Coding (HEVC) Screen Content Coding: Draft 6," Joint Collaborative Team on Video Coding (JCT-VC) of ITU-T SG 16 WP 3 and ISO/IEC JTC 1/SC 29/WG 11, 23rd Meeting: San Diego, USA, 19-26 Feb. 2016 (hereinafter "JCTVC-W1005-v1"), a slice segment header may include a slice_temporal_mvp_enabled_flag syntax element and a collocated_ref_idx syntax element. The value of the slice_temporal_mvp_enabled_flag indicates whether the slice segment header includes particular syntax elements, including the collocated_ref_idx syntax element, as shown in the following portion of the syntax table for the slice segment header.

```
if( slice_temporal_mvp_enabled_flag) {
    if( slice_type == B )
        collocated_from_l0_flag                u(1)
    if( ( collocated_from_l0_flag &&
        num_ref_idxl0_active_minus1 > 0 ) ||
```

```
        ( !collocated_from_l0_flag &&
        num_ref_idx_l1_active_minus1 > 0 ) )
            collocated_ref_idx                              ue(v)
}
```

The following text from section 7.4.7.1 of JCTVC-W1005-v1 describes the slice_temporal_mvp_enabled_flag:

slice_temporal_mvp_enabled_flag specifies whether temporal motion vector predictors can be used for inter prediction. If slice_temporal_mvp_enabled_flag is equal to 0, the syntax elements of the current picture shall be constrained such that no temporal motion vector predictor is used in decoding of the current picture. Otherwise (slice_temporal_mvp_enabled_flag is equal to 1), temporal motion vector predictors may be used in decoding of the current picture. When not present, the value of slice_temporal_mvp_enabled_flag is inferred to be equal to 0.

Let currLayerId be equal to nuh_layer_id of the current NAL unit. When both slice_temporal_mvp_enabled_flag and TemporalId are equal to 0, the syntax elements for all coded pictures with nuh_layer_id equal to currLayerId that follow the current picture in decoding order shall be constrained such that no temporal motion vector from any picture with nuh_layer_id equal to currLayerId that precedes the current picture in decoding order is used in decoding of any coded picture that follows the current picture in decoding order.

NOTE 1—When slice_temporal_mvp_enabled_flag is equal to 0 in an I slice, it has no impact on the normative decoding process of the picture but merely expresses a bitstream constraint.

NOTE 2—When slice_temporal_mvp_enabled_flag is equal to 0 in a slice with TemporalId equal to 0, decoders may empty "motion vector storage" for all reference pictures with nuh_layer_id equal to currLayerId in the decoded picture buffer.

The following text of JCTVC-W1005-v1 describes the collocated_from_l0_flag syntax element and the collocated_ref_idx syntax element:

collocated_from_l0_flag equal to 1 specifies that the collocated picture used for temporal motion vector prediction is derived from reference picture list 0. collocated_from_l0_flag equal to 0 specifies that the collocated picture used for temporal motion vector prediction is derived from reference picture list 1. When collocated_from_l0_flag is not present, it is inferred to be equal to 1.

collocated_ref_idx specifies the reference index of the collocated picture used for temporal motion vector prediction.

When slice type is equal to P or when slice type is equal to B and collocated_from_l0_flag is equal to 1, collocated_ref_idx refers to a picture in list 0, and the value of collocated_ref_idx shall be in the range of 0 to num_ref_idx_l0_active_minus1, inclusive.

When slice_type is equal to B and collocated_from_l0_flag is equal to 0, collocated_ref_idx refers to a picture in list 1, and the value of collocated_ref_idx shall be in the range of 0 to num_ref_idx_l1_active_minus1, inclusive.

When collocated_ref_idx is not present, the value of collocated_ref_idx is inferred to be equal to 0.

It is a requirement of bitstream conformance that the picture referred to by collocated_ref_idx shall be the same for all slices of a coded picture and shall not be the current picture itself.

In general, the slice_temporal_mvp_enabled_flag indicates whether or not the use of temporal motion vector predictors is allowed for a slice. If temporal motion vector predictors are allowed for a slice, the value of the collocated_ref_idx syntax element is an index for the reference picture used for temporal motion vector prediction.

Clause 7.4.7.1 of JCTVC-W1005-v1 defines the semantics of the syntax element collocated_ref_idx, including a value inference and a bitstream conformance constraint as follows:

When not present, the value of collocated_ref_idx is inferred to be equal to 0. It is a requirement of bitstream conformance that the picture referred to by collocated_ref_idx shall be the same for all slices of a coded picture and shall not be the current picture itself.

This bitstream conformance constraint possibly causes some unnecessary restrictions on the bitstreams, possibly affecting the coding efficiency. As an example, consider that the slices in a current picture use two temporal reference pictures T0 and T1 (where T0 and/or T1 may or may not be the current picture itself). Also consider that there are two slices in the current picture. As defined by JCTVC-W1005-v1, if slice_temporal_mvp_enabled_flag takes the value 0 for each slice, then the value of collocated_ref_idx is inferred to be 0 for each slice. In this case, the following arrangement of reference picture lists (RPL) for the slices is forbidden by the bitstream conformance constraint of JCTVC-W1005-v1:

|  |  | Reference picture list |
|---|---|---|
| slice_temporal_mvp_enabled_flag = 0 | slice 0 | T0, T1 |
|  | slice 1 | T1, T0 |

This is because the collocated_ref_idx of 0 points to T0 for slice 0 and T1 for slice 1. Hence, it may be necessary to use reference picture reordering or some other mechanism to make the first entry in the RPLs of both slices to be the same. This is potentially unnecessary and may waste bits when the value of slice_temporal_mvp_enabled_flag is 0 (i.e., temporal predictors are not used for the slice). In this case, the collocated_ref_idx and the pictures referred to by collocated_ref_idx have no effect on the reconstructed pictures, as temporal predictors are not used, and as such, the index to reference pictures containing such temporal predictors have no use for those particular slices.

Another example where the bitstream constraint of JCTVC-W1005-v1 may be unnecessary is when at least one I-slice is present in a picture. Please note that in some examples of HEVC, the I-slice does not permit the use of a current picture as a reference, as an I-slice is only coded using intra prediction:

|  |  | slice type |
|---|---|---|
| slice_temporal_mvp_enabled_flag = 0 | slice 0 | I-slice |
|  | slice 1 | P-slice |

Again, in this case, the value of collocated_ref_idx would be inferred to be 0. For the I-slice, since there is no reference picture list, the picture pointed to by the collocated_ref_idx is not even defined, and is, of course, not used. Thus, conformance checking of the bitstream conformance constraint is impossible in this example.

Another example where the bitstream constraint of JCTVC-W1005-v1 may be unnecessary, is for a picture where at least one I-slice (intra slice type) is present, and slice_temporal_mvp_enabled_flag is equal to 1 (i.e., temporal predictors are allowed), as follows:

|  |  | slice type |
| --- | --- | --- |
| slice_temporal_mvp_enabled_flag = 1 | slice 0 | I-slice |
|  | slice 1 | P-slice |

In this case, the collocated picture (e.g., as indicated by the value of collocated_ref_idx) is derived for the P-slice type (P inter slice type) and is undefined for the I-slice type, so it is not possible to perform the conformance check. A P-slice type is a slice that may be coded using unidirectional inter prediction and/or intra prediction. A B-slice type (B inter slice type) is a slice that may be coded using unidirectional inter prediction, bidirectional inter prediction, and/or intra prediction.

In general, with the current conformance check in some example proposals for HEVC, including the example of JCTVC-W1005-v1, all bitstreams are not conformant, since bitstreams always have at least one I-slice. As such, the collocated picture conformance check is not possible to perform using the constraint of JCTVC-W1005-v1.

In view of the foregoing, this disclosure describes bitstream conformance checks for syntax elements (and variables derived from the syntax elements) only in cases when those instances of the syntax elements have an impact on the decoding process. For those cases where the variables and syntax elements do not affect the decoding results, bitstream conformance checks are not performed.

For example, for a collocated reference picture index syntax element conformance check (e.g., a bitstream conformance check on the collocated_ref_idx syntax element), video encoder 20 and/or video decoder 30 may be configured to exclude the cases in which the parameters (e.g., the collocated_ref_idx syntax element) do not have impact on the decoding process or do not change the decoding output from conformance checking. That is, video encoder 20 and/or video decoder 30 may perform conformance checks only in the situations defined below.

In one example, this disclosure proposes to modify the bitstream conformance constraint such that it applies only when slice_temporal_mvp_enabled_flag is equal to 1 (i.e., when temporal motion vector predictors are allowed for a slice), as follows:

When slice_temporal_mvp_enabled_flag is equal to 1, it is a requirement of bitstream conformance that the picture referred to by collocated_ref_idx shall be the same for all slices of a coded picture, and the picture referred to by collocated_ref_idx shall not be the current picture itself.

In this example, video encoder 20 and/or video decoder 30 may only perform a bitstream conformance check on the value of collocated_ref_idx when temporal motion vector predictors are allowed for a slice. Video encoder 20 and/or video decoder 30 do not perform the conformance check when temporal motion vector predictors are not allowed for the slice. Video encoder 20 and/or video decoder 30 may perform the bitstream conformance check to verify that the value of collocated_ref_idx for a particular slice points to the same picture as the collocated_ref_idx for all other slices. Note that due to reference picture list management processes, the collocated_ref_idx may have different values for different slices, but still may point to the same reference picture. That is, different slices may assign index values to reference pictures in different orders. The bitstream conformance check also verifies that the value of collocated_ref_idx is not referencing the current picture itself.

Video encoder 20 may be configured to perform the bitstream conformance check after generating the value of collocated_ref_idx for each slice header. In other words, video encoder 20 may be configured to perform the bitstream conformance check to verify that the value video encoder 20 assigned to the collocated_ref_idx meets the criteria of the predefined bitstream conformance. Such a process may be used for the bitstream conformance constraint defined above, or for any of the examples described below.

Video decoder 30 may be configured to perform the bitstream conformance check on a received encoded video bitstream. After video decoder 30 receives and parses the slice header to determine the value of the collocated_ref_idx syntax element (whether received or inferred), video decoder 30 may compare the value of the collocated_ref_idx syntax element for a particular slice to the values of collocated_ref_idx syntax elements for other slices of the same picture to verify that the values meet the predefined conformance constraints (e.g., all collocated_ref_idx syntax elements for a picture point to the same reference picture). If video decoder 30 determines that the bitstream passes the conformance check, video decoder 30 may proceed to decode as normal. If video decoder 30 determines that the bitstream does not pass the conformance check, video decoder 30 may log an error. Video decoder 30 may still attempt to decode the bitstream, even if a bitstream conformance check is not satisfied.

In another example, this disclosure proposes to modify the bitstream conformance constraint such that video encoder 20 and/or video decoder 30 take into account both the slice type (e.g., a value of a slice type syntax element) and the value of slice_temporal_mvp_enabled_flag, as follows:

It is a requirement of bitstream conformance that the picture referred to by collocated_ref_idx shall be the same for all slices of a coded picture for which the value of the slice_temporal_mvp_enabled_flag is equal to 1 and slice_type is not equal to 2. Furthermore, when the value of the slice_temporal_mvp_enabled_flag is equal to 1, the picture referred to by collocated_ref_idx shall not be the current picture itself.

In this example, video encoder 20 and/or video decoder 30 may only perform a bitstream conformance check on the value of collocated_ref_idx when temporal motion vector predictors are allowed for a slice and when the slice type is not an intra slice type. Video encoder 20 and/or video decoder 30 do not perform the conformance check when temporal motion vector predictors are not allowed for the slice or when the slice type is an intra slice type. As is defined in JCTVC-W1005-v1 the syntax element slice_type having a value of 2 indicates an intra slice type (I-slice). Thus, video encoder 20 imposes the constraint that the collocated_ref_idx shall refer to the same picture only for slices which are of slice type P or B (e.g., non-Intra) and for which the value of the slice_temporal_mvp_enabled_flag is equal to 1 (i.e., temporal motion vector predictors are enabled). As discussed above, video decoder 30 may perform the same conformance check on a received video encoding bitstream.

When the value of slice_temporal_mvp_enabled_flag is equal to 0 (i.e., temporal motion vector predictors are not enabled), the picture referred to by the collocated_ref_idx does not affect the reconstructed pictures. Thus, the picture referred to by collocated_ref_idx shall not be the current picture only when the value of slice_temporal_mvp_enabled_flag is equal to 1.

As discussed above, in JCTVC-W1005-v1, in clause 7.4.7.1 in the semantics of collocated_ref_idx, there is a bitstream conformance constraint which states:

It is a requirement of bitstream conformance that the picture referred to by collocated_ref_idx shall be the same for all slices of a coded picture and shall not be the current picture itself.

This constraint implies that if there is a slice with only the current picture in the (final) reference picture list (RPL), the slice_temporal_mvp_enabled_flag shall be 0. Since it is also a bitstream conformance requirement that all the slices in a picture have the same value of slice_temporal_mvp_enabled_flag, it implies that if there is at least one slice with only the current picture in the (final) RPL, for all slices of the picture, the value of slice_temporal_mvp_enabled_flag shall be 0. The above statement is true even if the bitstream conformance constraint is modified as specified in the previous examples of the disclosure.

In some examples of HEVC, if the TemporalId for the picture is 0, according to the semantics of slice_temporal_mvp_enabled_flag, pictures later in the decoding order in the same layer shall not use temporal motion vector predictors from pictures before the current pictures in decoding order. This may allow decoders (e.g., video decoder 30) to flush motion vector information of earlier pictures in decoding order. Previously (in accordance with an earlier version of the HEVC standard) a video encoder could control whether to enable flushing of the motion vector information for error resilience purposes and make an optimal tradeoff between coding efficiency and error resilience. With the proposed techniques of JCTVC-W1005-v1, this flexibility is lost whenever the current picture contains at least one slice with only the current picture in the (final) reference picture list (RPL). In order to keep the flexibility, a video encoder would have to include some picture other than the current picture into the RPL. In cases where it is desirable to have only active reference index pointing to the current picture itself, adding some other picture into RPL would unnecessarily require the signaling of the reference index at block level and therefore result in significant coding overhead.

In view of the foregoing, this disclosure proposes the following additional techniques. The bitstream conformance constraint in clause 7.4.7.1 of JCTVC-W1005-v1, in the semantics of collocated_ref_idx, may be modified as follows. The following text shows example changes to the HEVC SCC specification of JCTVC-W1005-v1 and/or changes to some of the techniques described above. Inserted text is shown between <insert> and </insert> tags. Deleted text is shown between <delete> and </delete> tags.

<insert> When slice_temporal_mvp_enabled_flag is equal to 1</insert>, it is a requirement of bitstream conformance that the picture referred to by collocated_ref_idx shall be the same for all slices of a coded picture-<delete> and shall not be the current picture itself</delete>.

In another example, the modified bitstream conformance constraint described above can be changed as follows:

It is a requirement of bitstream conformance that the picture referred to by collocated_ref_idx shall be the same for all slices of a coded picture for which the value of the slice_temporal_mvp_enabled_flag is equal to 1 and slice type is not equal to 2-<delete> and furthermore, when the value of the slice_temporal_mvp_enabled_flag is equal to 1, the picture referred to by collocated_ref_idx shall not be the current picture itself</delete>.

In addition, if the collocated_ref_idx refers to the current picture, the temporal motion vector prediction candidate is treated as unavailable. This may be accomplished by the following change to JCTVC-W1005-v1:

8.5.3.2.8 Derivation Process for Temporal Luma Motion Vector Prediction

Inputs to this Process are:
a luma location (xPb, yPb) specifying the top-left sample of the current luma prediction block relative to the top-left luma sample of the current picture,
two variables nPbW and nPbH specifying the width and the height of the luma prediction block,
a reference index refIdxLX, with X being 0 or 1.

Outputs of this Process are:
the motion vector prediction mvLXCol,
the availability flag availableFlagLXCol.

The variable currPb specifies the current luma prediction block at luma location (xPb, yPb).

The variables mvLXCol and availableFlagLXCol are derived as follows:

If slice_temporal_mvp_enabled_flag is equal to 0, both components of mvLXCol are set equal to 0 and availableFlagLXCol is set equal to 0.

<insert> Otherwise, if the reference picture is the current picture, both components of mvLXCol are set equal to 0 and availableFlagLXCol is set equal to 0</insert>.

Otherwise (slice_temporal_mvp_enabled_flag is equal to 1), the following ordered steps apply:

In other examples, the conformance check for a collocated picture can be modified as follows. The following examples may be performed together in any combination.

In one example, the definition of the collocated_ref_idx syntax element may be modified in JCTVC-W1005-v1 to recite: <insert> When not present and slice_type is not equal to 2, the value of collocated_ref_idx is inferred to be equal to 0</insert>. When slice type is I (i.e., slice_type is equal to 2), video encoder 20 and/or video decoder 30 do not infer the collocated reference index and no conformance check is performed for the collocated reference index. In other words, video encoder 20 and/or video decoder 30 are configured to perform the conformance check when the slice type for a slice is not an intra slice.

In another example of the disclosure, video encoder 20 and/or video decoder 30 are configured to only perform a conformance check for the value of the collocated_ref_idx syntax element when a collocated picture is needed or relevant in the decoding process. Video encoder 20 and/or video decoder 30 are configured to derive the value of the collocated_ref_idx syntax element for slices in a way so that the collocated_ref_idx syntax element is able to pass the conformance check. For example, video encoder 20 and/or video decoder 30 may be configured to derive a certain collocated picture derived for I-slices in a picture. Such a collocated picture is not needed for I-slices, but it will be the same for all slices, and hence conformance check is fulfilled. A collocated picture is not needed for I-slices regardless of the value of the slice_temporal_mvp_enabled_flag, and is not needed for non-I-slices when slice_temporal_mvp_enabled_flag is equal to 0 (i.e., temporal motion vector predictors are not allowed).

In another example of the disclosure, video encoder 20 and/or video decoder 30 may be configured to perform a conformance check on the collocated_ref_idx only for the cases when slice_temporal_mvp_enabled_flag is equal to 1 (i.e., temporal motion vector predictors are enabled) and the slice type of a slice of a picture is other than an I-slice type (e.g., slice_type is not equal to 2).

In another example of the disclosure, video encoder 20 and/or video decoder 30 may be configured to perform a conformance check on the collocated_ref_idx only for the cases when slice_temporal_mvp_enabled_flag is equal to 1 (i.e., temporal motion vector predictors are enabled) and the slice type of a slice of a picture is other than an I-slice type (e.g., slice_type is not equal to 2), and the slice has reference pictures other than the current picture. If the current picture is the only reference picture, it cannot be the collocated picture, regardless of the value of the slice_temporal_mvp_enabled_flag. In this case, video encoder 20 and/or video decoder 30 may be configured to not perform a conformance check on the collocated_ref_idx for such slices.

In another example of the disclosure, video encoder 20 and/or video decoder 30 may be configured to perform a conformance check on the collocated_ref_idx only for the cases when the collocated picture is used in a decoding process of a slice, or has an impact in the slice decoding output. If video encoder 20 and/or video decoder 30 are configured to derive the collocated picture, but not use the collocated picture in a slice, video encoder 20 and/or video decoder 30 may be configured to skip the conformance check for the reference index (e.g., collocated_ref_idx) for such a picture.

In another example, of the disclosure, video encoder 20 and/or video decoder 30 may be configured to perform a conformance check on the collocated_ref_idx only for the derived collocated pictures. If video encoder 20 and/or video decoder 30 do not derive a collocated picture for some slices, video encoder 20 and/or video decoder 30 may not perform a conformance check for collocated_ref_idx.

In another example of the disclosure, video encoder 20 and/or video decoder 30 may be configured to perform a conformance check on the collocated_ref_idx only for the slices when slice_temporal_mvp_enabled_flag is equal to 1 (i.e., when temporal motion vector predictors are enabled).

In JCTVC-W1005-v1, some slices within a picture may use only the current picture as reference, whereas other slices in the same picture may use temporal pictures as well as the current picture as references. For slices using picture(s) other than the current picture as reference, it may be desirable (from a coding efficiency point of view) to allow the use of a temporal motion vector prediction (mvp) candidate (e.g., a temporal motion vector predictor). This implies that the syntax element slice_temporal_mvp_enabled_flag should have a value equal to 1 for such a slice (i.e., temporal motion vector predictors are enabled). According to JCTVC-W1005-v1, it is a normative requirement that the value of slice_temporal_mvp_enabled_flag shall be the same for all slice segment headers of a coded picture. Thus, if one slice of a coded picture uses a temporal mvp candidate, slice_temporal_mvp_enabled_flag should have the value 1 for all slice segment headers of that coded picture.

On the other hand, JCTVC-W1005-v1 specifies that the collocated_ref_idx indicates the reference index of the collocated picture used for temporal motion vector prediction. As discussed above, JCTVC-W1005-v1 indicates it is a requirement of bitstream conformance that the picture referred to by collocated_ref_idx shall be the same for all slices of a coded picture and shall not be the current picture itself.

Based on the constraints on the slice_temporal_mvp_enabled_flag and collocated_ref_idx syntax elements, JCTVC-W1005-v1 implies that if one of the slices has only the current picture as reference, it is a normative requirement that temporal motion vector prediction is disabled for that slice, or equivalently that the slice_temporal_mvp_enabled_flag for that slice has the value 0. This in turn implies that the slice_temporal_mvp_enabled_flag has the value 0 for all slice segment headers of that picture.

Thus, according to JCTVC-W1005-v1, if one of the slices of a picture uses only the current picture as reference, it is a normative requirement that the temporal motion vector prediction is disabled for all the slices in that picture. That is, slice_temporal_mvp_enabled_flag has the value 0 for all the slice segment headers of that picture. As noted above, this may lead to a loss in coding efficiency.

An alternate solution, but less efficient from a coding efficiency point of view, is that for the slice using only the current picture as reference, an additional temporal reference is introduced to satisfy the current constraints of JCTVC-W1005-v1. A video encoder may avoid the use of the additional temporal reference without affecting the ability to signal any motion vectors as in the current specification. However, in this scenario, the reference index needs to be signalled instead of inferred, thereby leading to a loss of coding efficiency.

The techniques of this disclosure enable the use of temporal motion vector prediction for slices that use temporal reference pictures. Thus, this disclosure describes that the usage of the temporal MVP can be decided on a slice-by-slice basis, and that video encoder 20 and/or video decoder 30 may make the determination to use a temporal MVP differently for different slices of the same picture. Furthermore, this disclosure describes that for slices within the same picture that have slice_temporal_mvp_enabled_flag equal to 1, the collocated_ref_idx shall be the same. The normative requirements on the slice_temporal_mvp_enabled_flag and the collocated_ref_idx are modified as described below.

For example, video encoder 20 may encode video data. In this example, video encoder 20 may encode a first slice of a picture of the video data. Furthermore, in this example, video encoder 20 may encode a second slice of the same picture. As part of encoding the first slice, video encoder 20 may include, in a slice header for the first slice, a syntax element indicating that temporal motion vector prediction is enabled for the first slice. As part of encoding the second slice, video encoder 20 may include, in a slice header for the second slice, a syntax element indicating that temporal motion vector prediction is disabled for the second slice. (A slice segment header may also be referred to as a slice header.) Thus, video encoder 20 may include syntax elements in slice headers of slices of a picture that indicate that temporal motion vector prediction is enabled for some of the slices but not other ones of the slices of the picture. In some examples of this disclosure, for each slice of the picture for which temporal motion vector prediction is enabled, video encoder 20 includes, in the bitstream, syntax elements (e.g., collocated_ref_idx) indicating that the same reference picture is used for the temporal motion vector prediction.

Video decoder 30 may decode encoded video data. As part of decoding the encoded video data, video decoder 30 may obtain, from a slice header of a first slice of a picture of the video data, a syntax element (e.g., slice_temporal_mvp_enabled_flag) indicating that temporal motion vector prediction is enabled for the first slice. Additionally, in this example, video decoder 30 may obtain, from a slice header of a second slice of the same picture, a syntax element (e.g., slice_temporal_mvp_enabled_flag) indicating that temporal motion vector prediction is disabled for the slice.

When temporal motion vector prediction is enabled for the slice, a video coder (e.g., video encoder 20 or video decoder 30) may use temporal motion vector prediction to determine motion parameters (e.g., one or more motion vectors and reference indexes) of a current block (e.g., PU) of a slice of a current picture. For instance, the video coder may determine a candidate (e.g., a merge mode or AMVP candidate) specifying motion parameters of a block in a temporal reference picture (e.g., a picture having a different picture order count (POC) value from the current picture, or a picture in a different access unit from the current picture). As described above, the video coder may use a selected candidate in a motion predictor list (e.g., a merge or AMVP candidate list) to determine motion parameters of the current block. The video coder may use the motion parameters of the current block to determine a predictive block for the current block. As part of encoding the current block, video encoder 20 may use the predictive block to generate residual data. As described elsewhere in this disclosure, video encoder 20 may include, in a bitstream, data based on the residual data. As part of decoding the current block, video decoder 30 may use the predictive block and residual data to reconstruct samples of the current block. In this way, based on a syntax element indicating temporal motion vector prediction is enabled for a slice, video decoder 30 may use temporal motion vector prediction to decode a block of the slice. When temporal motion vector prediction is not enabled (i.e., disabled) for a slice, a video coder may not use temporal motion vector prediction to code (i.e., encode or decode) any block of the slice.

Example 1

The following text shows example changes to JCTVC-W1005-v1 in accordance with one or more techniques of this disclosure. Inserted text is shown between <insert> and </insert> tags. Deleted text is shown between <delete> and </delete> tags.

7.4.7.1 General Slice Segment Header Semantics
When present, the value of the slice segment header syntax elements slice_pic_parameter_set_id, pic_output_flag, no_output_of_prior_pics_flag, slice_pic_order_cnt_lsb, short_term_ref_pic_set_sps_flag, short_term_ref_pic_set_idx, <insert> and </insert> num_long_term_sps, num_long_term_pics<delete>, and slice_temporal_mvp_enabled_flag</delete> shall be the same in all slice segment headers of a coded picture. When present, the value of the slice segment header syntax elements lt_idx_sps[i], poc_lsb_lt [i], used_by_curr_pic_lt_flag [i], delta_poc_msb_present_flag[i], and delta_poc_msb_cycle_lt[i] shall be the same in all slice segment headers of a coded picture for each possible value of i.
. . .

<insert> It is a requirement of bitstream conformance that if a slice contains only the current picture as reference, slice_temporal_mvp_enabled_flag shall be equal to zero.</insert>
. . .

In semantics of collocated_ref_idx:
It is a requirement of bitstream conformance that the picture referred to by collocated_ref_idx shall be the same for all slices of a coded picture <insert> that have slice_temporal_mvp_enabled_flag equal to 1</insert> and shall not be the current picture itself.
[end of specification snippet]

This is the most general case in that there is no restriction on the value of the slice_temporal_mvp_enabled_flag except in the case when the slice contains only the current picture as reference.

Example 2

In this second example, an additional constraint is imposed on the syntax element slice_temporal_mvp_enabled_flag.

7.4.7.1 General Slice Segment Header Semantics
When present, the value of the slice segment header syntax elements slice_pic_parameter_set_id, pic_output_flag, no_output_of_prior_pics_flag, slice_pic_order_cnt_lsb, short_term_ref_pic_set_sps_flag, short_term_ref_pic_set_idx, <insert> and </insert> num_long_term_sps, num_long_term_pics<delete>, and slice_temporal_mvp_enabled_flag</delete> shall be the same in all slice segment headers of a coded picture. When present, the value of the slice segment header syntax elements lt_idx_sps[i], poc_lsb_lt [i], used_by_curr_pic_lt_flag[i], delta_poc_msb_present_flag[i], and delta_poc_msb_cycle_lt[i] shall be the same in all slice segment headers of a coded picture for each possible value of i.
<insert> When present, the value of the slice segment header syntax element slice_temporal_mvp_enabled_flag shall be the same in all slice segment headers of slices of a coded picture that use a reference picture other than the current picture.</insert>
<insert> It is a requirement of bitstream conformance that if a slice contains only the current picture as reference, slice_temporal_mvp_enabled_flag shall be equal to zero.</insert>
. . .

In semantics of collocated_ref_idx:
It is a requirement of bitstream conformance that the picture referred to by collocated_ref_idx shall be the same for all slices of a coded picture <insert> that have slice_temporal_mvp_enabled_flag equal to 1</insert> and shall not be the current picture itself.

Example 3

In some examples, the constraints mentioned in the previous embodiments can be modified as follows.
<insert> When present, the value of the slice segment header syntax element slice_temporal_mvp_enabled_flag shall be the same in all slice segment headers of slices, which are not I-slice type, of a coded picture.</insert>
In another alternative example,
<insert> When present, the value of the slice segment header syntax element slice_temporal_mvp_enabled_flag shall be the same in all slice segment headers of slices of a coded picture for which slice_temporal_mvp_enabled_flag is explicitly signalled (not inferred).</insert>

Example 4

Alternatively, the syntax element slice_temporal_mvp_enabled_flag is not signalled when the slice contains only the current picture as reference. As an example, a variable, sliceContainsTemporalRefPic, is set to be equal to 1 if the slice contains at least one reference picture that is not the current picture.

|  | Descriptor |
|---|---|
| slice_segment_header( ) { | |
|     first_slice_segment_in_pic_flag | u(1) |
| ......... | |
|     if( sps_temporal_mvp_enabled_flag <insert>&&<br>sliceContainsTemporalRefPic</insert> ) | |
|         slice_temporal_mvp_enabled_flag | u(1) |
| ...... | |
|     byte_alignment( ) | |
| } | |

In some instances, two or more of the examples of this disclosure may be used together. In other instances, the examples of this disclosure are used separately.

Figure 2:
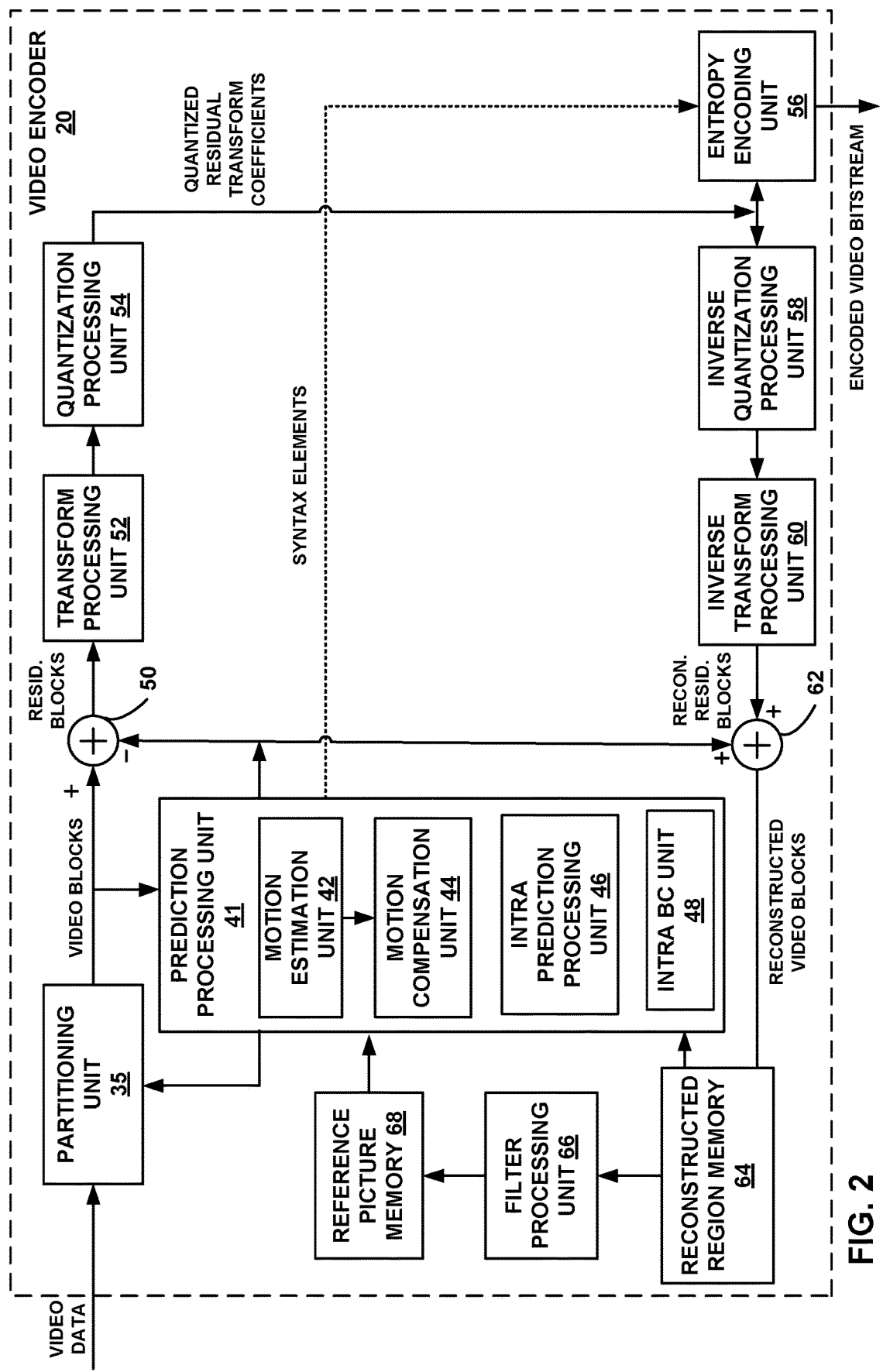
FIG. 2 is a block diagram illustrating an example video encoder that may implement one or more techniques described in this disclosure.

FIG. 2 is a block diagram illustrating an example video encoder that may implement any combination of the conformance constraint check techniques described in this disclosure. Video encoder 20 may perform intra- and inter-coding of video blocks within video slices. Intra coding relies on spatial prediction to reduce or remove spatial redundancy in video within a given video frame or picture. Inter-coding relies on temporal or inter-view prediction to reduce or remove redundancy in video within adjacent frames or pictures of a video sequence. Intra-mode (I mode) may refer to any of several spatial based compression modes. Inter-modes, such as uni-directional prediction (P mode) or bi-prediction (B mode), may include to any of several temporal-based compression modes. Video encoder 20 may also be configured to utilize a mode for intra prediction of blocks of video data from predictive blocks of video data within the same picture, e.g., an Intra BC mode, as described herein.

In the example of FIG. 2, video encoder 20 includes a partitioning unit 35, prediction processing unit 41, reconstructed region memory 64, filter processing unit 66, reference picture memory 68, residual generation unit 50, transform processing unit 52, quantization processing unit 54, and entropy encoding unit 56. Prediction processing unit 41 includes motion estimation unit 42, motion compensation unit 44, intra prediction processing unit 46, and Intra Block Copy (Intra BC) unit 48. For video block reconstruction, video encoder 20 also includes inverse quantization processing unit 58, inverse transform processing unit 60, and summer 62.

In various examples, a unit of video encoder 20 may be tasked to perform the techniques of this disclosure. Also, in some examples, the techniques of this disclosure may be divided among one or more of the units of video encoder 20. For example, prediction processing unit 41 may perform the techniques of this disclosure, alone, or in combination with other units of video encoder, such as motion estimation unit 42, motion compensation unit 44, intra prediction processing unit 46, reconstructed region memory 64, and entropy encoding unit 56.

As described above, video encoder 20 may be configured to perform a bitstream conformance check after generating the value of collocated_ref_idx for each slice header. In other words, video encoder 20 may be configured to perform the bitstream conformance check to verify that the value video encoder 20 assigned to the collocated_ref_idx meets the criteria of the predefined bitstream conformance. Such a process may be used for the bitstream conformance constraint defined above.

In one example, video encoder 20 may be configured to encode a current picture of video data, and generate a respective collocated reference picture index syntax element for one or more slices of the current picture. Video encoder 20 may be further configured to perform a bitstream conformance check only for slices of the one or more slices that do not have an intra slice type and for which a temporal motion vector predictor is enabled. The bitstream conformance check constrains the values of the respective collocated reference picture index syntax elements such that each respective collocated reference picture index syntax element points to the same picture and does not reference the current picture itself.

As shown in FIG. 2, video encoder 20 receives video data, and partitioning unit 35 partitions the video data into video blocks. This partitioning may also include partitioning into slices, tiles, or other larger units, as well as video block partitioning, e.g., according to a quadtree structure of LCUs and CUs. Video encoder 20 generally illustrates the components that encode video blocks within a video slice to be encoded. The slice may be divided into multiple video blocks (and possibly into sets of video blocks referred to as tiles).

Prediction processing unit 41 may select one of a plurality of possible coding modes, such as one of a plurality of intra coding modes, one of a plurality of inter coding modes, or an Intra BC mode according to the techniques described in this disclosure, for a current video block based on rate-distortion results (e.g., coding bit rate and the level of distortion). Prediction processing unit 41 may provide the resulting predictive block to residual generation unit 50 to generate residual block data and to summer 62 to reconstruct the current block for use in prediction of other video blocks, e.g., as a reference picture.

Intra prediction processing unit 46 within prediction processing unit 41 may perform intra-predictive coding of the current video block relative to one or more neighboring blocks in the same picture or slice as the current block to be coded to provide spatial compression. Motion estimation unit 42 and motion compensation unit 44 within prediction processing unit 41 perform inter-predictive coding of the current video block relative to one or more predictive blocks in one or more reference pictures, e.g., to provide temporal compression.

Motion estimation unit 42 may be configured to determine the inter-prediction mode for a video slice according to a predetermined pattern for a video sequence. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video picture relative to a predictive block within a reference picture. Similarly, the block vector used for Intra BC according to the techniques of this disclosure indicate the displacement of a PU of a video block within a current video frame or picture relative to a predictive block within the same frame or picture. Intra BC unit 48 may determine vectors, e.g., block vectors, for Intra BC coding in a manner similar to the determination of motion vectors by motion estimation unit 42 for inter prediction, or may utilize motion estimation unit 42 to determine the block vector.

A predictive block, e.g., identified by motion estimation unit 42 and/or Intra BC unit 48 for inter prediction or Intra BC prediction, is a block that includes samples that are found to closely match samples in a prediction block of a PU of the video block to be coded in terms of pixel difference. In some examples, motion estimation unit 42 and/or Intra BC unit 48 may determine the pixel difference based on a sum of absolute difference (SAD), a sum of squared difference (SSD), and/or other difference metrics. In some examples, video encoder 20 may calculate values for sub-integer pixel positions of reference pictures stored in reference picture memory 68 or the reconstructed region of the current picture stored in reconstructed region memory 64. For example, video encoder 20 may interpolate values of one-quarter pixel positions, one-eighth pixel positions, or other fractional pixel positions of the reference picture. Therefore, motion estimation unit 42 and/or Intra BC unit 48 may perform a search for a predictive block relative to the full pixel positions and fractional pixel positions and output a vector with fractional pixel precision.

Motion estimation unit 42 may calculate a motion vector for a PU of a video block in an inter-coded slice by comparing the position of the PU to the position of a predictive block of a reference picture. The reference picture may be selected from a first reference picture list (List 0 or RefPicList0) or a second reference picture list (List 1 or RefPicList1), each of which identify one or more reference pictures stored in reference picture memory 68. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of a video block, motion compensation unit 44 may locate the predictive block to which the motion vector points in one of the reference picture lists.

In some examples, Intra BC unit 48 may generate vectors and fetch predictive blocks in a manner similar to that described above with respect to motion estimation unit 42 and motion compensation unit 44, but with the predictive blocks being in the same picture or frame as the current block and with the vectors being referred to as block vectors as opposed to motion vectors. In other examples, Intra BC unit 48 may use motion estimation unit 42 and motion compensation unit 44, in whole or in part, to perform such functions for Intra BC prediction according to the techniques described herein. In either case, for Intra BC, a predictive block may be a block that is found to closely match the block to be coded, in terms of pixel difference, which may be determined by sum of absolute difference (SAD), sum of squared difference (SSD), or other difference metrics, and identification of the block may include calculation of values for sub-integer pixel positions.

Whether the predictive block is from the same picture according to Intra BC prediction, or a different picture according to inter prediction, video encoder 20 may form a residual video block by subtracting sample values (e.g., pixel values) of the predictive block from the sample values of the current video block being coded, forming sample difference values. The sample difference values form residual data for the block, and may include both luma component differences and chroma component differences. Residual generation unit 50 represents the component or components that perform this subtraction operation. In some examples, as opposed to directly performing subtraction to form the sample difference values, residual generation unit 50 may perform operations to emulate a subtraction operation (i.e., such that the result is the same as subtraction but without the computational complexities of subtraction). In this way, residual generation unit 50 may reduce the computational complexity of Intra BC coding.

Intra BC unit 48 and/or motion compensation unit 44 may also generate syntax elements associated with the video blocks and the video slice for use by a video decoder, such as video decoder 30, in decoding the video blocks of the video slice. The syntax elements may include, for example, syntax elements defining the vector used to identify the predictive block, any flags indicating the prediction mode, or any other syntax described with respect to the techniques of this disclosure.

Intra prediction processing unit 46 may intra-predict a current block, as an alternative to the inter-prediction performed by motion estimation unit 42 and motion compensation unit 44, or the Intra BC prediction performed by Intra BC unit 48, as described above. In particular, intra prediction processing unit 46 may determine an intra-prediction mode to use to encode a current block. In some examples, intra prediction processing unit 46 may encode a current video block using various intra-prediction modes, e.g., during separate encoding passes, and intra prediction processing unit 46 (or prediction processing unit 41, in some examples) may select an appropriate intra-prediction mode to use from the tested modes. For example, intra prediction processing unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra prediction processing unit 46 may calculate ratios from the distortions and rates for the various encoded blocks to determine which intra-prediction mode exhibits the best rate-distortion value for the block.

In any case, after selecting an intra-prediction mode for a block, intra prediction processing unit 46 may provide information indicative of the selected intra-prediction mode for the block to entropy encoding unit 56. Entropy encoding unit 56 may encode the information indicating the selected intra-prediction mode in accordance with the techniques of this disclosure. Video encoder 20 may include, in the transmitted bitstream, configuration data, which may include a plurality of intra-prediction mode index tables and a plurality of modified intra-prediction mode index tables (also referred to as codeword mapping tables), definitions of encoding contexts for various blocks, indications of a most probable intra-prediction mode, an intra-prediction mode index table, and a modified intra-prediction mode index table to use for each of the contexts.

After prediction processing unit 41 generates the predictive block for the current video block via inter-prediction, intra-prediction, or Intra BC prediction, video encoder 20 forms a residual video block by subtracting the predictive block from the current video block, e.g., via residual generation unit 50. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization processing unit 54. Quantization processing unit 54 quantizes the transform coefficients to further reduce bit rate. The quantization process may reduce the bit depth associated with some or all of the coefficients. The degree of quantization may be modified by adjusting a quantization parameter. In some examples, quantization processing unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Entropy encoding unit 56 may perform any of the techniques described herein for binarization and encoding syntax elements, including vector components, flags, and other syntax elements, for the prediction according to the Intra BC mode. Following the entropy encoding by entropy encoding unit 56, the encoded video bitstream may be transmitted to video decoder 30, or archived for later transmission or retrieval by video decoder 30.

Inverse quantization processing unit 58 and inverse transform processing unit 60 apply inverse quantization and inverse transformation, respectively, to reconstruct the residual block in the pixel domain for later use as a reference block for prediction of other video blocks. Motion compensation unit 44 and/or Intra BC unit 48 may calculate a reference block by adding the residual block to a predictive block of one of the reference pictures within one of the reference picture lists. Motion compensation unit 44 and/or Intra BC unit 48 may also apply one or more interpolation filters to the reconstructed residual block to calculate sub-integer pixel values for use in motion estimation.

Summer 62 adds the reconstructed residual block to the motion compensated prediction block produced by motion compensation unit 44 and/or Intra BC unit 48 to produce a reconstructed video block. Reconstructed region memory 64 stores reconstructed video blocks according to the definition of the reconstructed region for Intra BC of a current video block by video encoder 20, e.g., Intra BC unit 48, as described herein. Reconstructed region memory 64 may store reconstructed video blocks that have not been in-loop filtered by filter processing unit 66. Summer 62 may provide the reconstructed video blocks to filter processing unit 66 in parallel with reconstructed region memory 64, or reconstructed region memory 64 may release the reconstructed video blocks to filter processing unit 66 when no longer needed for the reconstructed region for Intra BC. In either case, Intra BC unit 48 may search the reconstructed video blocks in reconstructed region memory 64 for a predictive video block within the same picture as the current video block to predict the current video block.

Filter processing unit 66 may perform in-loop filtering on the reconstructed video blocks. In-loop filtering may include deblock filtering to filter block boundaries to remove blockiness artifacts from reconstructed video. In-loop filtering may also include SAO filtering to improve the reconstructed video. Reconstructed blocks, some of which may be in-loop filtered, may be stored in reference picture memory 68 as reference pictures. The reference pictures may include reconstructed blocks that may be used by motion estimation unit 42 and motion compensation unit 44 as a predictive block to inter-predict a block in a subsequent video frame or picture.

Figure 3:
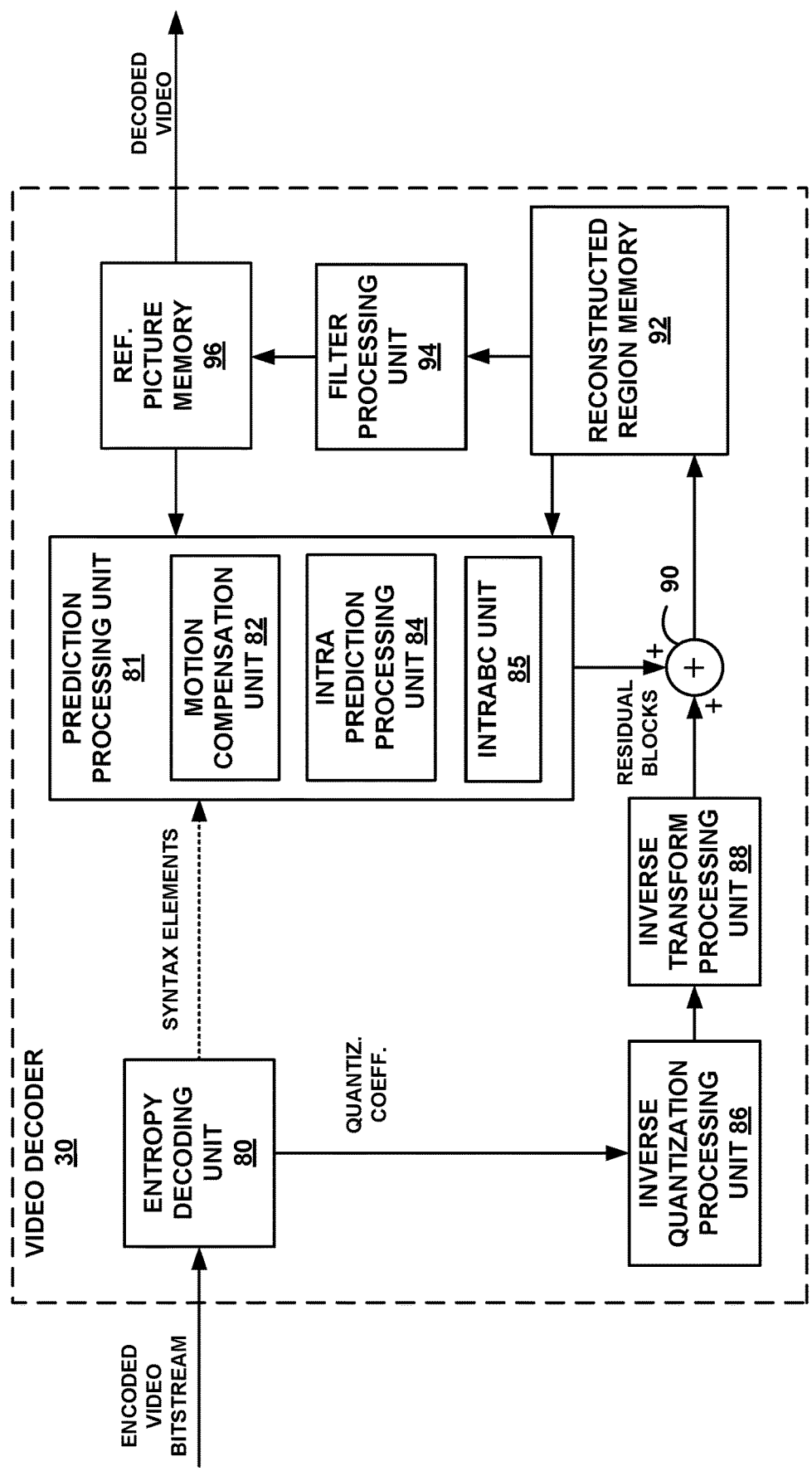
FIG. 3 is a block diagram illustrating an example video decoder that may implement one or more techniques described in this disclosure.

FIG. 3 is a block diagram illustrating an example video decoder 30 that may implement any combination of the conformance constraint check techniques described in this disclosure. In the example of FIG. 3, video decoder 30 includes entropy decoding unit 80, prediction processing unit 81, inverse quantization processing unit 86, inverse transform processing unit 88, summer 90, reconstructed region memory 92, filter processing unit 94, and reference picture memory 96. Prediction processing unit 81 includes motion compensation unit 82, intra prediction processing unit 84, and an Intra Block Copy (Intra BC) unit 85. Video decoder 30 may, in some examples, perform a decoding pass generally reciprocal to the encoding pass described with respect to video encoder 20 from FIG. 2.

In various examples, a unit of video decoder 30 may be tasked to perform the techniques of this disclosure. Also, in some examples, the techniques of this disclosure may be divided among one or more of the units of video decoder 30. For example, Intra BC unit 85 may perform the techniques of this disclosure, alone, or in combination with other units of video decoder 30, such as motion compensation unit 82, intra prediction processing unit 84, reconstructed region memory 92, and entropy decoding unit 80.

As described above, video decoder 30 may be configured to perform a bitstream conformance check on a received encoded video bitstream. After video decoder 30 receives and parses a slice header to determine the value of the collocated_ref_idx syntax element (whether received or inferred), video decoder 30 may compare the value of the collocated_ref_idx syntax element for a particular slice to the values of collocated_ref_idx syntax elements for other slices of the same picture to verify that the values meet the predefined conformance constraints. If video decoder 30 determines that the bitstream passes the conformance check, video decoder 30 may proceed to decode as normal. If video decoder 30 determines that the bitstream does not pass the conformance check, video decoder 30 may log an error. Video decoder 30 may still attempt to decode the bitstream, even if a bitstream conformance check is not satisfied.

In one example of the disclosure, video decoder 30 may be configured to receive the encoded current picture of video data, and receive a respective collocated reference picture index syntax element for one or more slices of the encoded current picture. Video decoder 30 may be further configured to perform a bitstream conformance check only for slices of the one or more slices that do not have an intra slice type and for which a temporal motion vector predictor is enabled. The bitstream conformance check determines if each respective collocated reference picture index syntax element points to the same picture and does not reference the encoded current picture itself.

During the decoding process, video decoder 30 receives an encoded video bitstream that represents video blocks of an encoded video slice and associated syntax elements from video encoder 20. Entropy decoding unit 80 of video decoder 30 entropy decodes the bitstream to generate quantized coefficients, motion vectors for inter prediction, block vectors for Intra BC prediction, and other syntax elements described herein. Entropy decoding unit 80 may perform the inverse of any of the techniques described herein for binarization and encoding of syntax elements, including vector components, flags, and other syntax elements, for the prediction according to the Intra BC mode. Entropy decoding unit 80 forwards the vectors and other syntax elements to prediction processing unit 81. Video decoder 30 may obtain the syntax elements at the sequence level, the picture level, the video slice level and/or the video block level.

In some examples, entropy decoding unit 80 uses a process that is generally reciprocal to the encoding process used by entropy encoding unit 56 of encoder 20 to encode the block vector. For instance, entropy decoding unit 80 may decode the component of the block vector based on three syntax elements.

Intra BC unit 80 may determine the value of the block vector for the current block based on a selected block vector predictor candidate and the difference indicated by the syntax elements (i.e., the difference between the selected block vector predictor and the block vector for the current block). In this way, entropy decoding unit 80 and Intra BC unit 80 may decode an encoded block vector.

When the video slice is coded as an intra-coded (I) slice, intra prediction processing unit 84 of prediction processing unit 81 may generate prediction data for a video block of the current video slice based on a signaled intra prediction mode and data from previously decoded blocks of the current frame or picture. When the video frame is coded as an inter-coded (i.e., B or P) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within one of the reference picture lists. Video decoder 30 may construct the reference frame lists, RefPicList0 and RefPicList1, using default construction techniques or any other technique based on reference pictures stored in reference picture memory 96. When the video block is coded according to the Intra BC mode described herein, Intra BC unit 85 of prediction processing unit 81 produces predictive blocks for the current video block based on block vectors and other syntax elements received from entropy decoding unit 80. The predictive blocks may be within a reconstructed region within the same picture as the current video block defined by video encoder 20, and retrieved from reconstructed region memory 92.

Motion compensation unit 82 and Intra BC unit 85 determine prediction information for a video block of the current video slice by parsing the vectors and other syntax elements, and use the prediction information to produce the predictive blocks for the current video block being decoded. For example, motion compensation unit 82 uses some of the received syntax elements to determine a prediction mode (e.g., intra- or inter-prediction) used to code the video blocks of the video slice, an inter-prediction slice type (e.g., B slice or P slice), construction information for one or more of the reference picture lists for the slice, motion vectors for each inter-encoded video block of the slice, inter-prediction status for each inter-coded video block of the slice, and other information to decode the video blocks in the current video slice. Similarly, Intra BC unit 85 may use some of the received syntax elements, e.g., a flag, to determine that the current video block was predicted using the Intra BC mode, construction information indicating which video blocks of the picture are within the reconstructed region and should be stored in reconstructed region memory 92, block vectors for each Intra BC predicted video block of the slice, Intra BC prediction status for each Intra BC predicted video block of the slice, and other information to decode the video blocks in the current video slice.

Motion compensation unit 82 and Intra BC unit 85 may also perform interpolation based on interpolation filters. Motion compensation unit 82 and Intra BC unit 85 may use interpolation filters as used by video encoder 20 during encoding of the video blocks to calculate interpolated values for sub-integer pixels of predictive blocks. In this case, motion compensation unit 82 and Intra BC unit 85 may determine the interpolation filters used by video encoder 20 from the received syntax elements and use the interpolation filters to produce predictive blocks.

Inverse quantization processing unit 86 inverse quantizes, i.e., dequantizes, the quantized transform coefficients provided in the bitstream and decoded by entropy decoding unit 80. The inverse quantization process may include use of a quantization parameter calculated by video encoder 20 for each video block in the video slice to determine a degree of quantization and, likewise, a degree of inverse quantization that should be applied. Inverse transform processing unit 88 applies an inverse transform, e.g., an inverse DCT, an inverse integer transform, or a conceptually similar inverse transform process, to the transform coefficients in order to produce residual blocks in the pixel domain.

After motion compensation unit 82 or Intra BC unit 85 generates the predictive block for the current video block based on the vectors and other syntax elements, video decoder 30 forms a decoded video block by summing the residual blocks from inverse transform processing unit 88 with the corresponding predictive blocks generated by motion compensation unit 82 and Intra BC unit 85. Summer 90 represents the component or components that perform this summation operation to produce reconstructed video blocks.

Reconstructed region memory 92 stores reconstructed video blocks according to the definition of the reconstructed region for Intra BC of a current video block by video encoder 20, as described herein. Reconstructed region memory 92 may store reconstructed video blocks that have not been in-loop filtered by filter processing unit 394. Summer 90 may provide the reconstructed video blocks to filter processing unit 94 in parallel with reconstructed region memory 92, or reconstructed region memory 92 may release the reconstructed video blocks to filter processing unit 94 when no longer needed for the reconstructed region for Intra BC. In either case, Intra BC unit 85 retrieves a predictive video block for a current video block from reconstructed region memory 92.

Filter processing unit 94 may perform in-loop filtering on the reconstructed video blocks. In-loop filtering may include deblock filtering to filter block boundaries to remove blockiness artifacts from reconstructed video. In-loop filtering may also include SAO filtering to improve the reconstructed video. Reconstructed blocks, some of which may be in-loop filtered, may be stored in reference picture memory 68 as reference pictures. The reference pictures may include reconstructed blocks that may be used by motion compensation unit 82 as predictive blocks to inter-predict a block in a subsequent video frame or picture. Reference picture memory 96 also stores decoded video for later presentation on a display device, such as display device 31 of FIG. 1.

Figure 4:
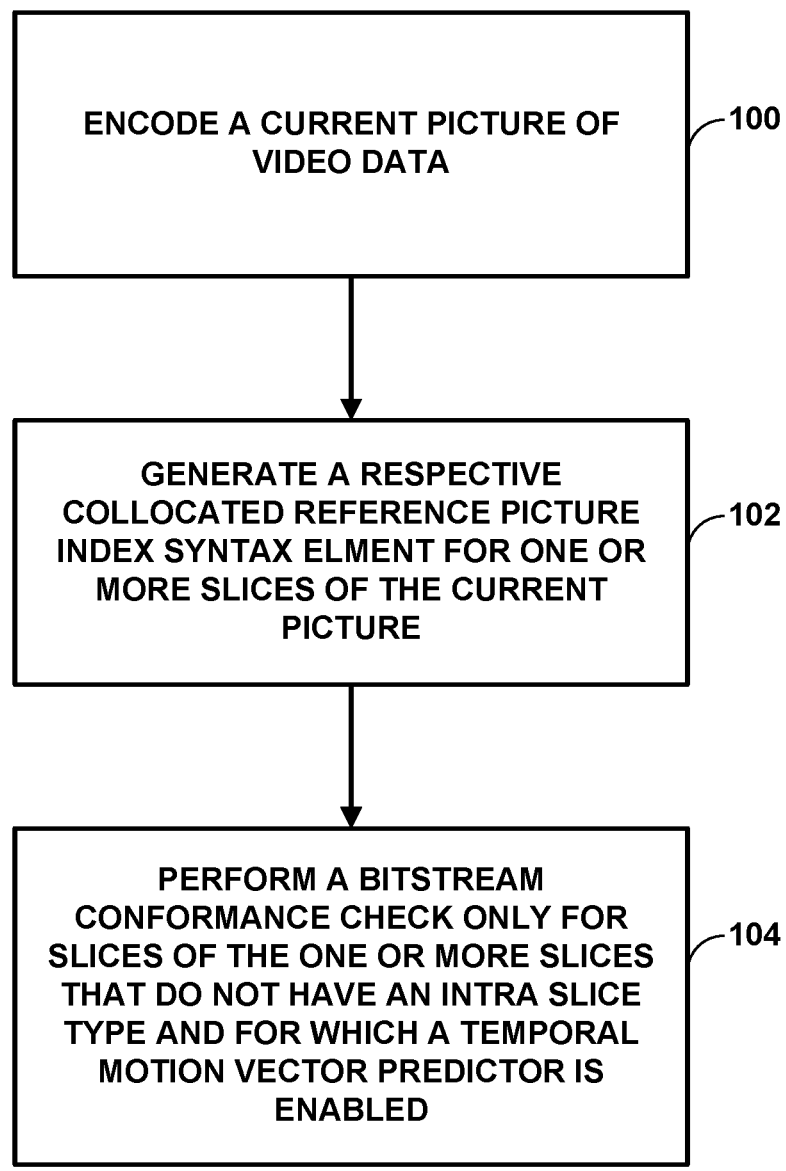
FIG. 4 is a flowchart illustrating an example encoding process of the disclosure.

FIG. 4 is a flowchart illustrating an example encoding process of the disclosure. The techniques of FIG. 4 may be performed by one or more hardware units of video encoder 20.

In one example of the disclosure, video encoder 20 may be configured to encode a current picture of video data (100), and generate a respective collocated reference picture index syntax element for one or more slices of the current picture (102). Video encoder 20 may be further configured to perform a bitstream conformance check only for slices of the one or more slices that do not have an intra slice type and for which a temporal motion vector predictor is enabled (104). In one example, the bitstream conformance check constrains the values of the respective collocated reference picture index syntax elements such that each respective collocated reference picture index syntax element points to the same picture and does not reference the current picture itself. In a further example of the disclosure, video encoder 20 may be configured to determine a slice type for the one or more slices, the slice type including one of a P inter slice type, a B inter slice type, or the intra slice type, and determine whether or not the temporal motion vector predictor is enabled for inter prediction for the one or more slices.

In another example of the disclosure, video encoder 20 may be configured to not perform the bitstream conformance check for slices of the one or more slices that have the intra slice type or for slices of the one or more slices where the temporal motion vector predictor is disabled.

In another example of the disclosure, video encoder 20 may be configured to generate the respective collocated reference picture index syntax elements in respective slice headers for the corresponding slices, and generate a temporal motion vector predictor enabled flag in respective slice headers of the one or more slices. In one example, the respective collocated reference picture index syntax elements are respective collocated_ref_idx syntax elements, and the temporal motion vector predictor enabled flag is a slice_temporal_mvp_enabled_flag.

In another example of the disclosure, video encoder 20 may be configured to encode one or more blocks of the current picture of video data using an inter-prediction mode that uses the current picture as a reference picture.

In another example of the disclosure, video encoder 20 may be configured to include, in a slice header for a first slice of the one more slices, a syntax element indicating that temporal motion vector predictors are enabled for the first slice, and include, in a second slice header for a second slice of the one or more slices, a syntax element indicating that temporal motion vector predictors are disabled for the second slice.

In another example of the disclosure, video encoder 20 may be configured to capture the current picture of video data to be encoded, and output the encoded current picture of video data.

Figure 5:
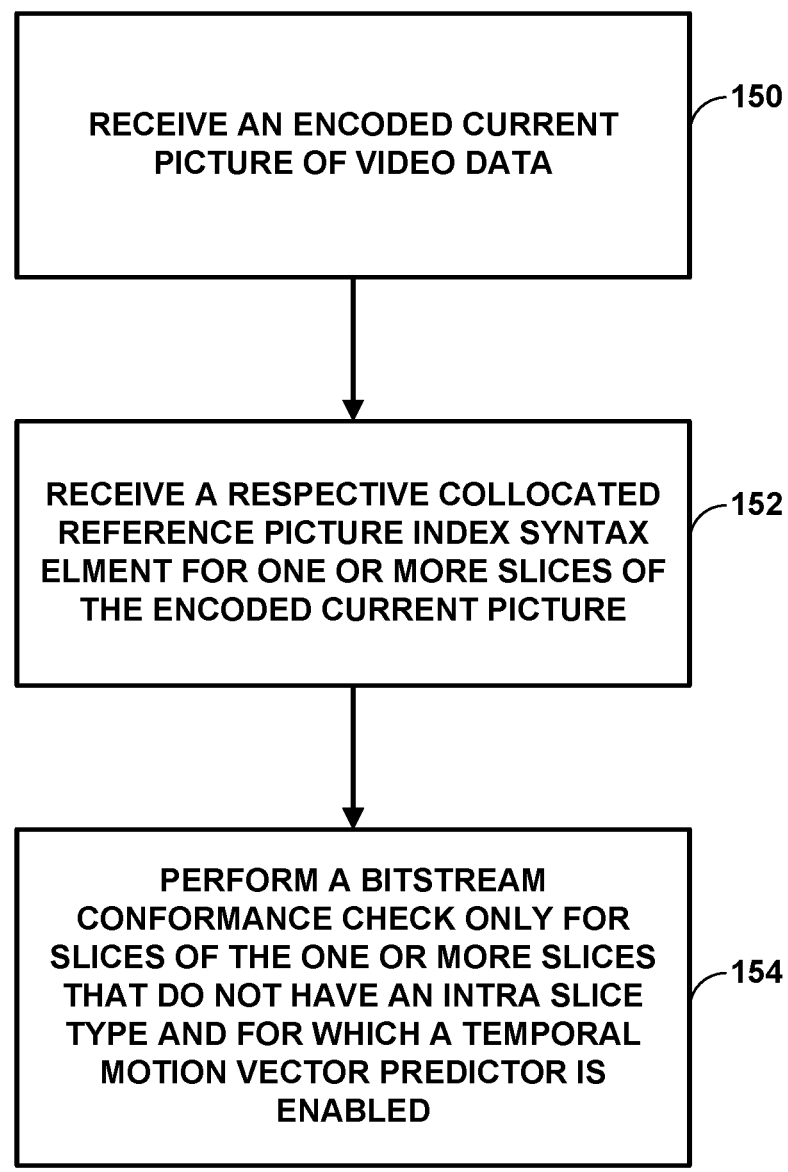
FIG. 5 is a flowchart illustrating an example decoding process of the disclosure.

FIG. 5 is a flowchart illustrating an example decoding process of the disclosure. The techniques of FIG. 4 may be performed by one or more hardware units of video decoder.

In one example of the disclosure, video decoder 30 may be configured to receive the encoded current picture of video data (150), and receive a respective collocated reference picture index syntax element for one or more slices of the encoded current picture (152). Video decoder 30 may be further configured to perform a bitstream conformance check only for slices of the one or more slices that do not have an intra slice type and for which a temporal motion vector predictor is enabled (154). In one example, the bitstream conformance check determines if each respective collocated reference picture index syntax element points to the same picture and does not reference the encoded current picture itself. In a further example of the disclosure, video decoder 30 may be configured to determine a slice type for the one or more slices, the slice type including one of a P inter slice type, a B inter slice type, or the intra slice type, and determine whether or not the temporal motion vector predictor is enabled for inter prediction for the one or more slices.

In another of the disclosure, video decoder 30 may be configured to not perform the bitstream conformance check for slices of the one or more slices that have the intra slice type or for slices of the one or more slices where the temporal motion vector predictor is disabled.

In another of the disclosure, video decoder 30 may be configured to receive the respective collocated reference picture index syntax elements in respective slice headers for the corresponding slices, and receive a temporal motion vector predictor enabled flag in respective slice headers of the one or more slices. In one example of the disclosure, the respective collocated reference picture index syntax elements are respective collocated_ref_idx syntax elements, and the temporal motion vector predictor enabled flag is a slice_temporal_mvp_enabled_flag.

In another of the disclosure, video decoder 30 may be configured to decode one or more blocks of the current picture of video data using an inter-prediction mode that uses the current picture as a reference picture.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of encoding video data, the method comprising:
   encoding a current picture of video data;
   generating a respective collocated reference picture index syntax element for one or more slices of the current picture; and
   performing a bitstream conformance check only for slices of the one or more slices that do not have an intra slice type and also for which a temporal motion vector predictor is enabled, the bitstream conformance check constraining the values of the respective collocated reference picture index syntax elements such that each respective collocated reference picture index syntax element points to the same picture and does not reference the current picture itself.

2. The method of claim 1, further comprising:
   determining a slice type for the one or more slices, the slice type including one of a P inter slice type, a B inter slice type, or the intra slice type; and
   determining whether or not the temporal motion vector predictor is enabled for inter prediction for the one or more slices.

3. The method of claim 1, further comprising:
   not performing the bitstream conformance check for slices of the one or more slices that have the intra slice type or for slices of the one or more slices where the temporal motion vector predictor is disabled.

4. The method of claim 1, further comprising:
   generating the respective collocated reference picture index syntax elements in respective slice headers for the corresponding slices; and
   generating a temporal motion vector predictor enabled flag in respective slice headers of the one or more slices.

5. The method of claim 4, wherein the respective collocated reference picture index syntax elements are respective collocated_ref_idx syntax elements, and
   wherein the temporal motion vector predictor enabled flag is a slice_temporal_mvp_enabled_flag.

6. The method of claim 1, wherein encoding the current picture of video data comprises:
   encoding one or more blocks of the current picture of video data using an inter-prediction mode that uses the current picture as a reference picture.

7. The method of claim 1, further comprising:
   including, in a slice header for a first slice of the one more slices, a syntax element indicating that temporal motion vector predictors are enabled for the first slice; and
   including, in a second slice header for a second slice of the one or more slices, a syntax element indicating that temporal motion vector predictors are disabled for the second slice.

8. The method of claim 1, further comprising:
   capturing the current picture of video data to be encoded; and
   outputting the encoded current picture of video data.

9. An apparatus configured to encode video data, the apparatus comprising:
   a memory configured to store a current picture of video data; and
   one or more processors configured to:
   encode a current picture of video data;
   generate a respective collocated reference picture index syntax element for one or more slices of the current picture; and
   perform a bitstream conformance check only for slices of the one or more slices that do not have an intra slice type and also for which a temporal motion vector predictor is enabled, the bitstream conformance check constrains the values of the respective collocated reference picture index syntax elements such that each respective collocated reference picture index syntax element points to the same picture and does not reference the current picture itself.

10. The apparatus of claim 9, wherein the one or more processors are further configured to:
    determine a slice type for the one or more slices, the slice type including one of a P inter slice type, a B inter slice type, or the intra slice type; and
    determine whether or not the temporal motion vector predictor is enabled for inter prediction for the one or more slices.

11. The apparatus of claim 9, wherein the one or more processors are further configured to:
    not perform the bitstream conformance check for slices of the one or more slices that have the intra slice type or for slices of the one or more slices where the temporal motion vector predictor is disabled.

12. The apparatus of claim 9, wherein the one or more processors are further configured to:
    generate the respective collocated reference picture index syntax elements in respective slice headers for the corresponding slices; and
    generate a temporal motion vector predictor enabled flag in respective slice headers of the one or more slices.

13. The apparatus of claim 12, wherein the respective collocated reference picture index syntax elements are respective collocated_ref_idx syntax elements, and
    wherein the temporal motion vector predictor enabled flag is a slice_temporal_mvp_enabled_flag.

14. The apparatus of claim 9, wherein to encode the current picture of video data, the one or more processors are further configured to:

encode one or more blocks of the current picture of video data using an inter-prediction mode that uses the current picture as a reference picture.

15. The apparatus of claim 9, wherein the one or more processors are further configured to:
include, in a slice header for a first slice of the one more slices, a syntax element indicating that temporal motion vector predictors are enabled for the first slice; and
include, in a second slice header for a second slice of the one or more slices, a syntax element indicating that temporal motion vector predictors are disabled for the second slice.

16. The apparatus of claim 9, wherein the one or more processors are further configured to:
capture the current picture of video data to be encoded; and
output the encoded current picture of video data.

17. A non-transitory computer-readable storage medium storing instructions that, when executed, causes one or more processors of a device configured to encode video data to:
encode a current picture of video data;
generate a respective collocated reference picture index syntax element for one or more slices of the current picture; and
perform a bitstream conformance check only for slices of the one or more slices that do not have an intra slice type and also for which a temporal motion vector predictor is enabled, the bitstream conformance check constrains the values of the respective collocated reference picture index syntax elements such that each respective collocated reference picture index syntax element points to the same picture and does not reference the current picture itself.

18. An apparatus configured to decode video data, the apparatus comprising:
a memory configured to store an encoded current picture of video data; and
one or more processors configured to:
receive the encoded current picture of video data;
receive a respective collocated reference picture index syntax element for one or more slices of the encoded current picture; and
perform a bitstream conformance check only for slices of the one or more slices that do not have an intra slice type and also for which a temporal motion vector predictor is enabled, the bitstream conformance check determining if each respective collocated reference picture index syntax element points to the same picture and does not reference the encoded current picture itself.

19. The apparatus of claim 18, wherein the one or more processors are further configured to:
determine a slice type for the one or more slices, the slice type including one of a P inter slice type, a B inter slice type, or the intra slice type; and
determine whether or not the temporal motion vector predictor is enabled for inter prediction for the one or more slices.

20. The apparatus of claim 18, wherein the one or more processors are further configured to:
not perform the bitstream conformance check for slices of the one or more slices that have the intra slice type or for slices of the one or more slices where the temporal motion vector predictor is disabled.

21. The apparatus of claim 18, wherein the one or more processors are further configured to:
receive the respective collocated reference picture index syntax elements in respective slice headers for the corresponding slices; and
receive a temporal motion vector predictor enabled flag in respective slice headers of the one or more slices.

22. The apparatus of claim 21, wherein the respective collocated reference picture index syntax elements are respective collocated_ref_idx syntax elements, and
wherein the temporal motion vector predictor enabled flag is a slice_temporal_mvp_enabled_flag.

23. The apparatus of claim 18, wherein the one or more processors are further configured to:
decode one or more blocks of the current picture of video data using an inter-prediction mode that uses the current picture as a reference picture.

* * * * *